(12) United States Patent
Shen et al.

(10) Patent No.: US 12,079,401 B2
(45) Date of Patent: Sep. 3, 2024

(54) KEYBOARD INCLUDING A BODY WATERPROOF LAYER AND A KEYCAP WATERPROOF LAYER, AND ELECTRONIC DEVICE

(71) Applicant: LANTO ELECTRONIC LIMITED, Kunshan (CN)

(72) Inventors: Chen Shen, Kunshan (CN); Yulin Chen, Kunshan (CN); Bing Ye, Kunshan (CN); Jingfa Lu, Kunshan (CN)

(73) Assignee: LANTO ELECTRONIC LIMITED, Kunshan (CN)

(*) Notice: Subject to any disclaimer, the term of this patent is extended or adjusted under 35 U.S.C. 154(b) by 0 days.

(21) Appl. No.: 18/211,181

(22) Filed: Jun. 16, 2023

(65) Prior Publication Data
US 2023/0409130 A1   Dec. 21, 2023

(30) Foreign Application Priority Data

Jun. 17, 2022  (CN) .......................... 202210687292.5
Nov. 30, 2022  (CN) .......................... 202211527943.0

(Continued)

(51) Int. Cl.
   *G06F 3/0354*   (2013.01)
   *G06F 3/02*   (2006.01)
   (Continued)

(52) U.S. Cl.
   CPC ........ *G06F 3/03547* (2013.01); *G06F 3/0213* (2013.01); *G06F 3/041* (2013.01); *H01H 13/86* (2013.01); *G06F 2203/04107* (2013.01)

(58) Field of Classification Search
   None
   See application file for complete search history.

(56) References Cited

U.S. PATENT DOCUMENTS 11,287,899 B1 * 3/2022 Wu ...................... H01H 13/703
2011/0141052 A1 * 6/2011 Bernstein ................ G06F 3/041
                                                                341/5

(Continued)

FOREIGN PATENT DOCUMENTS

CN    101699372 A  *  4/2010
CN    206162400 U      5/2017
(Continued)

*Primary Examiner* — Kirk W Hermann
(74) *Attorney, Agent, or Firm* — Birch, Stewart, Kolasch & Birch, LLP

(57) ABSTRACT

A keyboard and an electronic device, wherein the keyboard comprises: a keyboard module comprising a plurality of keycaps and a keyboard body; a body waterproof layer provided with an accommodating part; and a keycap waterproof layer comprising a first bonding part and a second bonding part, wherein each of the keycaps passes through the accommodating part, and the body waterproof layer is connected with the keyboard body; the first bonding part is bonded to a side of each of the keycaps away from the keyboard body, and the second bonding part is bonded to the accommodating part; and the body waterproof layer and the keycap waterproof layer are both an integrally formed structure; the electronic device comprises the keyboard above the a device body, the keyboard is connected with the device body by a signal.

19 Claims, 21 Drawing Sheets

(30) Foreign Application Priority Data

Nov. 30, 2022 (CN) .......................... 202211529456.8
Nov. 30, 2022 (CN) .......................... 202211529475.0

(51) Int. Cl.
 *G06F 3/041* (2006.01)
 *H01H 13/86* (2006.01)

(56) References Cited

U.S. PATENT DOCUMENTS

| | | | |
|---|---|---|---|
| 2017/0038801 A1* | 2/2017 | Lee | G06F 3/041 |
| 2017/0358407 A1* | 12/2017 | Wang | H01H 13/06 |
| 2018/0323021 A1* | 11/2018 | Lai | H01H 13/06 |
| 2019/0371543 A1* | 12/2019 | Chiang | G06F 3/03547 |
| 2022/0326777 A1 | 10/2022 | Ligtenberg et al. | |

FOREIGN PATENT DOCUMENTS

| | | | |
|---|---|---|---|
| CN | 110554739 A | | 12/2019 |
| CN | 212461465 U | * | 2/2021 |

\* cited by examiner (a)

(b)

KEYBOARD INCLUDING A BODY WATERPROOF LAYER AND A KEYCAP WATERPROOF LAYER, AND ELECTRONIC DEVICE

CROSS REFERENCE TO RELATED APPLICATIONS

This disclosure claims all the benefits of the Chinese patent application No. 202210687292.5 filed on Jun. 17, 2022 before the China National Intellectual Property Administration of the of the People's Republic of China, entitled "touch module and electronic device", the Chinese patent application No. 202211527943.0 filed on Nov. 30, 2022 before the China National Intellectual Property Administration of the People's Republic of China, entitled "keyboard, electronic device and manufacturing method of keyboard", the Chinese patent application No. 202211529456.8 filed on Nov. 30, 2022 before the China National Intellectual Property Administration of the People's Republic of China, entitled "keyboard, electronic device and manufacturing method of keyboard" and the Chinese patent application No. 202211529475.0 filed on Nov. 30, 2022 before the China National Intellectual Property Administration of the People's Republic of China, entitled "keyboard and electronic device".

FIELD

The present disclosure relates to the technical field of keyboards, in particular to a keyboard and an electronic device.

BACKGROUND

A keyboard is the most common and important input device which can input text information, programs, and numbers into an electronic device, and is also one of the most important production tools. With the continuous development of electronic device, keyboards are not only used in computers and other device, but also in portable notebook computers and tablet devices. The keyboard may realize connection and application of electronic device through wireless transmission or data cable connection. And with the continuous improvement of manufacturing technology, the quality of the keyboard is getting finer and finer, the number of taps that the keys may withstand has further increased significantly, and the overall service life of the keyboard has further been greatly improved.

With the more frequent use of electronic equipment and the more complex use scene, the factors that easily affect the service life of the keyboard are particles and liquids. Since the internal structure of the keyboard is equipped with a circuit board, electric induction will be generated during use, which will absorb particles or liquid molecules in the air, and when facing the water cup or a large amount of liquid, the circuit board structure inside the keyboard can be damaged. In the existing technology, a diversion structure is usually set in the slit of the keyboard, and a small amount of liquid is discharged from the fixed outlet through the direction of the diversion. Such a setting can protect the internal structure of the keyboard to a certain extent, but in the face of a large number of liquids and water vapor, the waterproof performance of the keyboard cannot be guaranteed, and the service life of the keyboard is still affected. That is, the waterproof and dustproof performance of the keyboard of the prior art is poor, resulting in a short service life of the keyboard.

SUMMARY

The disclosure provides a keyboard and an electronic device.

In a first aspect, an embodiment of the disclosure provides a keyboard comprising: a keyboard module comprising a plurality of keycaps and a keyboard body; a body waterproof layer provided with an accommodating part; and a keycap waterproof layer comprising a first bonding part and a second bonding part, wherein each of the keycaps passes through the accommodating part, and the body waterproof layer is connected with the keyboard body; the first bonding part is bonded to a side of each of the keycaps away from the keyboard body, and the second bonding part is bonded to the accommodating part; and the body waterproof layer and the keycap waterproof layer are both an integrally formed structure.

In some embodiments of the present disclosure, the accommodating part further comprises a first accommodating structure and a second accommodating structure, the keycap waterproof layer further comprises a third bonding part, the first accommodating structure is provided around a plurality of the keycaps, the third bonding part is provided around the first bonding part and the second bonding part, the third bonding part is bonded to the first accommodating structure, the second accommodating structure is net-shaped and is provided with a plurality of first through holes; the keycaps are provided in one-to-one correspondence with the first through holes, each of the keycaps passes through each of the first through holes and is bonded to the first bonding part, and the second accommodating structure is bonded to the second bonding part.

In some embodiments of the present disclosure, the keyboard further comprises a support assembly comprising a support layer provided between the keyboard body and the body waterproof layer, bonded to the keyboard body, and comprising a third accommodating structure, wherein the third accommodating structure is net-shaped and is provided with a plurality of third through holes, the keycaps are provided in one-to-one correspondence with the third through holes, and each of the keycaps passes through the third accommodating structure and is bonded to the first bonding part.

In some embodiments of the present disclosure, the body waterproof layer and the keycap waterproof layer are both an integrally formed structure, the first accommodating structure, the second accommodating structure, the second bonding part, and the third bonding part are integrated; the support assembly further comprises a first support structure, the support layer is provided between the first support structure and the keyboard body, the first support structure is net-shaped, the first support structure is bonded to the second bonding part, both the first support structure and the second bonding part are provided in a clearance between the adjacent keycaps, and the first support structure is an integrally formed structure.

In some embodiments of the present disclosure, a fit clearance is provided between the first support structure and the third accommodating structure, and a height H of the fit clearance is in a range of 0.15 mm to 0.5 mm.

In some embodiments of the present disclosure, the support assembly further comprises a buffer structure provided between the body waterproof layer and the support layer, the buffer structure comprises a first limiting part configured to surround the first support structure, and the buffer structure is bonded to the support layer.

In some embodiments of the present disclosure, the keyboard further comprises a touch module, the support layer further comprises a fourth accommodating structure, the touch module is provided in the fourth accommodating structure, the buffer structure further comprises a second limiting part, the touch module partially passes through the second limiting part and is connected with the body waterproof layer, and a touch part is provided at a position of the body waterproof layer corresponding to the touch module.

In some embodiments of the present disclosure, wherein the touch module comprises a decorative panel and a touch mainboard, the support layer further comprises a mounting frame provided in the fourth accommodating structure, the decorative panel is provided on the touch part, the touch mainboard is fixedly connected with the mounting frame, the touch mainboard is in contact with a side of the touch part away from the decorative panel, and the touch mainboard is electrically connected with the keyboard body.

In some embodiments of the present disclosure, the keyboard further comprises a bottom waterproof layer wrapping the keyboard module and bonded to the body waterproof layer made of flexible material, the bottom waterproof layer is made of waterproof leather, textiles or nano-fabric material, and the first support structure is made of PC, PET, PI, LCP or FR4 material.

In some embodiments of the present disclosure, the keycap waterproof layer further comprises a fourth bonding part; the keycap comprises a pressing surface, a keycap through hole and a keycap side wall, an opening of the keycap through hole is provided in the pressing surface, the first bonding part is bonded to the pressing surface, and the keycap side wall is bonded to the fourth bonding part; and the third accommodating structure is bonded to the second bonding part, an accommodating clearance is provided between the third accommodating structure and a vertical plane where a bottom lateral side of the adjacent keycap is located, and when the keycap is pressed, a deformation area of the keycap waterproof layer is located in the accommodating clearance.

In some embodiments of the present disclosure, the deformation area is a deformation part of the keycap waterproof layer, comprising a curving section and a bending section connected in sequence, an end of the curving section away from the bending section is connected with the fourth bonding part, the bending section is connected with the second bonding part, when the keycap is pressed, the deformation part is completely accommodated in the accommodating clearance, and the bending section rotates about a connection point between the bending section and the second bonding part.

In some embodiments of the present disclosure, when the keycap is not pressed, the fourth bonding part is completely bonded to a side wall of the keycap, and at least part of the deformation part is located within the accommodating clearance; or when the keycap is not pressed, the bending section and the second bonding part are located in a same plane, the bending section is arc-shaped, and the curving section is located on a side of the plane close to the keycap.

In some embodiments of the present disclosure, the keyboard further comprises an adhesive layer provided between the pressing surface and the first bonding part and respectively bonded to the pressing surface and the first bonding part, the keycap comprises a plurality of keycap through holes, a central axis of each of the keycap through holes is perpendicular to the pressing surface, a cross section of each of the keycap through holes is circular, and a maximum size of the cross section of the keycap through hole is in a range of 0.05 mm to mm.

In some embodiments of the present disclosure, a hole wall of the keycap through hole is provided in a straight line along a direction of the central axis; and/or a hole wall of the keycap through hole gradually moves away from the central axis along a direction of the central axis away from the pressing surface.

In some embodiments of the present disclosure, the keycap further comprises a limiting part surrounding the pressing surface to form an accommodating cavity of the adhesive layer.

In a second aspect, some embodiments of the disclosure provide an electronic device comprising the above keyboard and a device body, wherein the keyboard is connected with the device body by signal.

In some embodiments of the present disclosure, the keyboard comprises a touch module comprising: a substrate provided with a hollow groove;
a decorative panel provided in the hollow groove; a PCB board provided in the hollow groove and located below the decorative panel; and a touch waterproof layer located between the decorative panel and the PCB board,
wherein the touch waterproof layer comprises a touch waterproof layer body and an elastic recess structure provided on an outer edge of the touch waterproof layer body, the elastic recess structure is suspended in the hollow groove, and the touch waterproof layer is elastically connected with the substrate by the elastic recess structure.

In some embodiments of the present disclosure, the elastic recess structure comprises an elastic recess formed by bending the outer edge of the touch waterproof layer body and a fixing plate being away from the touch waterproof layer body and connected with the elastic recess, the fixing plate is fixedly connected with the substrate, the decorative panel covers at least part of the elastic recess, the elastic recess is provided in U shape or V shape, a horizontal height of the fixing plate is higher than a horizontal height of the touch waterproof layer body, and the fixing plate is attached to an upper surface of the substrate; or the fixing plate is aligned with the touch waterproof layer body, and the fixing plate is embedded in the substrate.

In some embodiments of the present disclosure, the touch module further comprises a plastic sheet layer, a metal support and a cover, the plastic sheet layer is located between the touch waterproof layer and the PCB board, the PCB board is placed on the metal support, and the metal support is provided with an elastic arm supported downward on the cover.

Embodiments of the present disclosure provides a keyboard comprising: a keyboard module comprising a plurality of keycaps and a keyboard body; a body waterproof layer provided with an accommodating part; and a keycap waterproof layer comprising a first bonding part and a second bonding part, wherein each of the keycaps passes through the accommodating part, and the body waterproof layer is connected with the keyboard body; the first bonding part is bonded to a side of each of the keycaps away from the keyboard body, and the second bonding part is bonded to the accommodating part; and the body waterproof layer and the keycap waterproof layer are both an integrally formed structure. The keycap passes through the body waterproof layer, so as to provide a space for pressing the keycap. The separately provided keycap waterproof layer is used for waterproofing the keycap area. The first bonding part and the second bonding part are bonded to the accommodating part, which realizes waterproofing of the keycap area, avoids entry of water vapor and dust, and does not affect use of the keycap 20. The problems that the keyboard in the related art is poor in waterproof and dustproof performance and the service life of the keyboard is seriously affected are solved effectively.

BRIEF DESCRIPTION OF THE DRAWINGS

The drawings herein are incorporated into the description and form part of the present description, illustrating embodiments consistent with the present disclosure, and together with the description for explaining the principles of the present disclosure.

In order to illustrate the embodiments of the present disclosure or the technical solution in the prior art more clearly, the drawings required to be used in the embodiments or prior art descriptions will be briefly described below, it will be apparent that for those of ordinary skilled in the art, without sacrificing creative labor, other drawings may further be obtained of these drawings.

Figure 1:
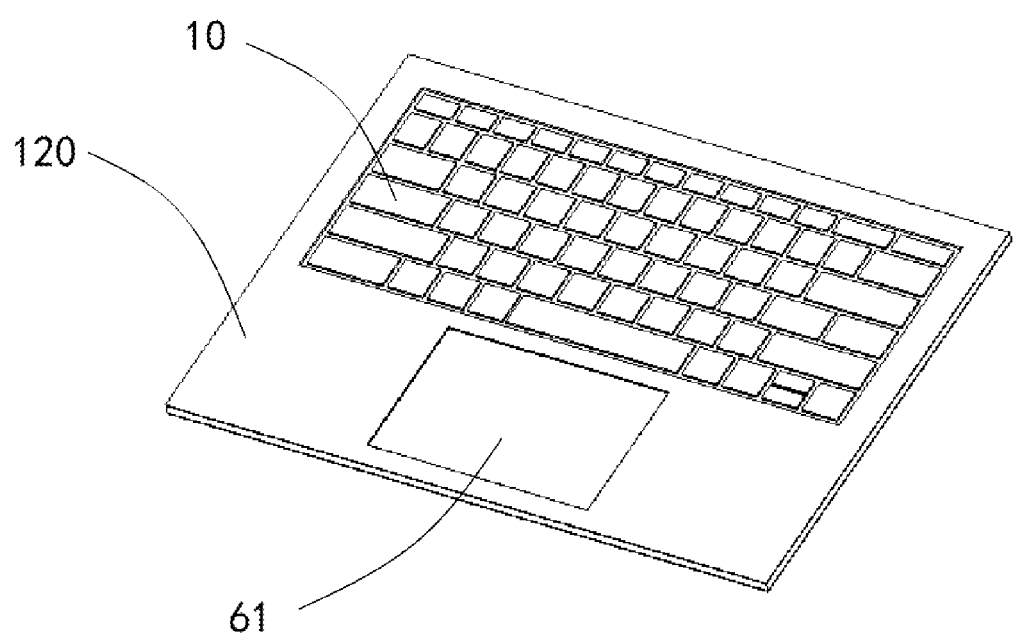
FIG. 1 is a three-dimensional structure diagram of a keyboard provided in Embodiment 1 of the present disclosure.

Wherein, the above-mentioned drawings comprise the following reference numerals:

10, keycap waterproof layer; 11, first bonding part; 12, second bonding part; 13, third bonding part; 114, fourth bonding part; 131, connection point; 14, deformation part; 141, curving section; 142, bending section; 20, keycap; 21, pressing surface; 102, first through hole; 22, keycap through hole; 23, keycap side wall; 24, limiting part; 130, support assembly; 31, first support structure; 40, accommodating clearance; 50, adhesive layer; 60, touch module; 61, decorative panel; 62, touch waterproof layer; 621, touch waterproof layer body; 622, elastic recess structure; 6221, elastic recess; 6222, fixing plate; 63, substrate; 631, hollow groove; 632, mounting part; 6321, fourth through hole; 6322, fifth through hole; 64, plastic layer; 65, PCB board; 66, metal support; 661, lug; 6611, sixth through hole; 6612, seventh through hole; 662, elastic arm; 663, limiting notch; 67, cover body; 70, bottom mounting plate; 80, bottom waterproof layer; 110, keyboard module; 112, keyboard body; 120, body waterproof layer; 121, accommodating part; 1211, first accommodating structure; 1212, second accommodating structure; 122, touch part; 411, second through hole; 412, support skeleton; 42, support layer; 421, third accommodating structure; 422, third through hole; 423, fourth accommodating structure; 424, mounting frame; 43, buffer structure; 431, first limiting part; 432, second limiting part; 52, touch mainboard.

DETAILED DESCRIPTION

In order to make the purpose, technical solutions and advantages of the embodiments of the present disclosure clearer, the technical solutions in the embodiments of the present disclosure will be clearly and completely described below in conjunction with the drawings in the embodiments of the present disclosure. Obviously, the described embodiments are parts of the embodiments of the present disclosure, but not all embodiments. Based on the embodiments in the present disclosure, all other embodiments obtained by persons of ordinary skilled in the art without making creative efforts belong to the protection scope of the present disclosure.

As shown in FIGS. 1 to 6, a technical solution of Embodiment 1 of the present disclosure provides a keyboard comprising: a keyboard module 110, a body waterproof layer 120 and a keycap waterproof layer 10, wherein the keyboard module 110 comprises a plurality of keycaps 20 and a keyboard body 112; the body waterproof layer 120 is provided with an accommodating part 121, each of the keycaps 20 passes through the accommodating part 121, and the body waterproof layer 120 is connected with the keyboard body 112; and the keycap waterproof layer 10 comprises a first bonding part 11 and a second bonding part 12, the first bonding part 11 is connected with a side of each keycap 20 away from the keyboard body 112, the second bonding part 12 is bonded to the accommodating part 121, and the body waterproof layer 120 and the keycap waterproof layer 10 are both an integrally formed structure. The keycap 20 passes through the body waterproof layer 120, so as to provide a space for pressing the keycap. The separately provided keycap waterproof layer 10 is used for waterproofing the keycap area. The first bonding part 11 and the second bonding part 12 are bonded to the accommodating part 121, which realizes waterproofing of the keycap area, avoids entry of water vapor and dust, and does not affect use of the keycap 20. The problems that the keyboard in the related art is poor in waterproof and dustproof performance and the service life of the keyboard is seriously affected are solved effectively.

It should be noted that the body waterproof layer 120 and the keycap waterproof layer 10 are both an integrally formed structure, which makes the structures simple, compact, and convenient to fit, has strong interchangeability between the body waterproof layer 120 and the keycap waterproof layer 10 in the same group, and is conducive to production and processing. In this embodiment, bonding means that two components may be in contact with each other, but it is not limited whether the bonded two components with each other belong to a fixed connection. After the assembly is completed, two bonded positions are compact in structure and are not easy to generate air bubbles. It is provided that when the keycap 20 is pressed, a certain clearance may be formed in the partially bonded area to adapt to the deformation of the keycap waterproof layer 10 when the keycap 20 is pressed. Meanwhile, the keycap waterproof layer 10 an integrally formed structure protects the keycap 20 and the clearance between the keycaps from being affected by water vapor or dust. Such structure reduces the need of waterproof and dustproof between the keycap 20 and the keyboard body 112 and transfers the requirement of waterproof and dustproof to the keycap waterproof layer 10, so that the keycap 20 and the keyboard body 112 may cooperate more closely. The accommodating part 121 is specifically a recessed accommodating cavity on the body waterproof layer 120. The first bonding part 11 and the second bonding part 12 of the keycap waterproof layer 10 may be completely placed inside the recessed accommodating cavity. The configuration may visually provide the user with a visual effect that the body waterproof layer 120 and the keycap waterproof layer 10 are on the same plane. In some embodiments of the present disclosure, such configuration is convenient for subsequently providing figures or patterns on the surface of the keyboard, and the display effect of the patterns on the same plane is better.

In another optional embodiment, before the keycap waterproof layer is in contact with the keycap 20, glue coating may be performed on the first bonding part 11, so that the top pressing area of the keycap 20 and the first bonding part 11 are tightly bonded, specifically, glue coating may be performed, and after bonding, the glue is solidified by baking at a high temperature, so that the first bonding part 11 and the keycap 20 are tightly bonded. Such configuration facilitates a tight fit between the keycap waterproof layer 10 and the keycap 20, and further avoids the generation of air bubbles that affect the pressing feel.

Figure 5:
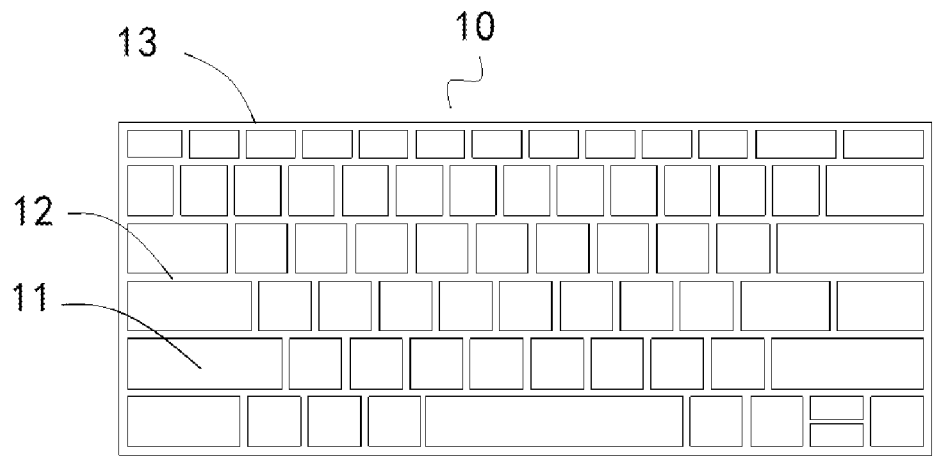
FIG. 5 shows a bottom view of a keycap waterproof layer of the keyboard in FIG. 1.
Figure 6:
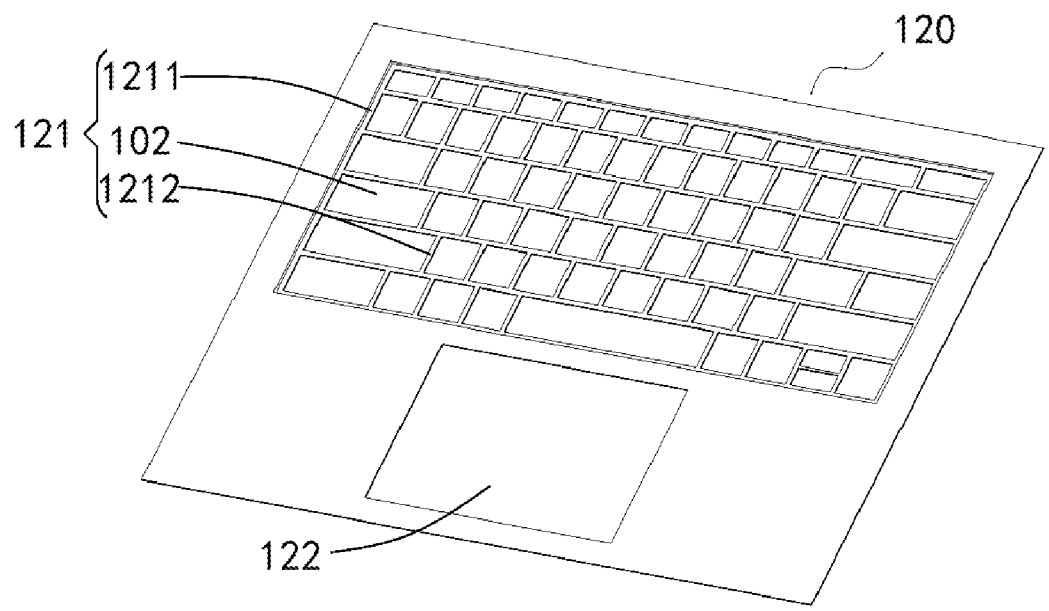
FIG. 6 shows a three-dimensional structure diagram of a body waterproof layer of the keyboard in FIG. 1.

As shown in FIG. 5 and FIG. 6, in the technical solution of embodiment 1, the accommodating part 121 further comprises a net-shaped second accommodating structure 1212 forming a plurality of first through holes 102. The keycaps 20 are provided in one-to-one correspondence with the first through holes 102, each keycap 20 passes through the first through hole 102 and is bonded to the first bonding part 11, and the second accommodating structure 1212 is bonded to the second bonding part 12. The second accommodating structure 1212 provided in a net shape may correspond to the bonding of the second bonding part 12 and completely isolate the keycap 20. After the second bonding part 12 is combined with the second accommodating structure 1212, the first bonding part 11 is divided into a plurality of corresponding single keycaps such configuration makes the waterproof layers between the keycaps 20 independent, and when the key is pressed down, the deformation of the individual first bonding part 11 close to its own side wall adapts to the keycap 20 is pressed down, avoiding the situation that the adjacent keycap 20 is pressed down, and may effectively improve the accuracy of keycap 20 knocking. Meanwhile, such configuration may better bond the second bonding part 12 and the second accommodating structure 1212, ensuring that the keycap waterproof layer 10 and the body waterproof layer 120 are closely combined, and the structure is more compact.

As shown in FIG. 1 to FIG. 6, in the technical solution of embodiment 1, the accommodating part 121 comprises a first accommodating structure 1211, the keycap waterproof layer 10 further comprises a third bonding part 13, and the first accommodating structure 1211 is provided around a plurality of the keycap 20. The third bonding part 13 is provided around the first bonding part 11 and the second bonding part 12, and the third bonding part 13 is bonded to the first accommodating structure 1211. Such configuration seals all the keycaps 20, and by the keycap waterproof layer 10 an integrally formed structure completely prevents water vapor or dust from entering the clearance between the keycaps 20. It should be noted that, in order to further improve the sealing effect, the third bonding part 13 may be completely bonded to the first accommodating structure 1211, and the width of the first accommodating structure 1211 is greater than the width of the third bonding part 13, so that a certain groove is left between side walls of the accommodating part 121 and the third bonding part 13, and the entry of water vapor and other substances is further isolated by filling sealant in the groove, which is more conducive to the waterproof performance of the keyboard. It should be noted that the second accommodating structure 1212 needs to surround the entire keycap area, so that the second accommodating structure 1212 has a larger frame, and the corresponding first accommodating structure 1211 is provided around the above frame, which may improve the bonding of the body waterproof layer 120 and keycap waterproof layer 10. In some embodiments of the present disclosure, the first accommodating structure 1211 and the second accommodating structure 1212 may be integrally formed, which is more conducive to the waterproof and dustproof performance of the waterproof layer.

Figure 3:
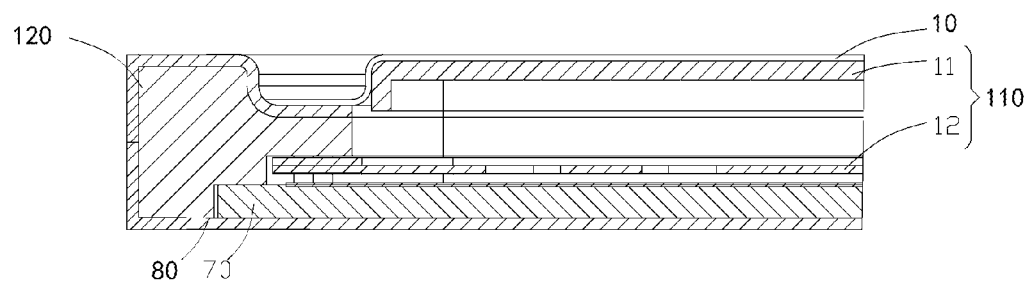
FIG. 3 shows a partial cross-sectional view of the keyboard in FIG. 1.
Figure 4:
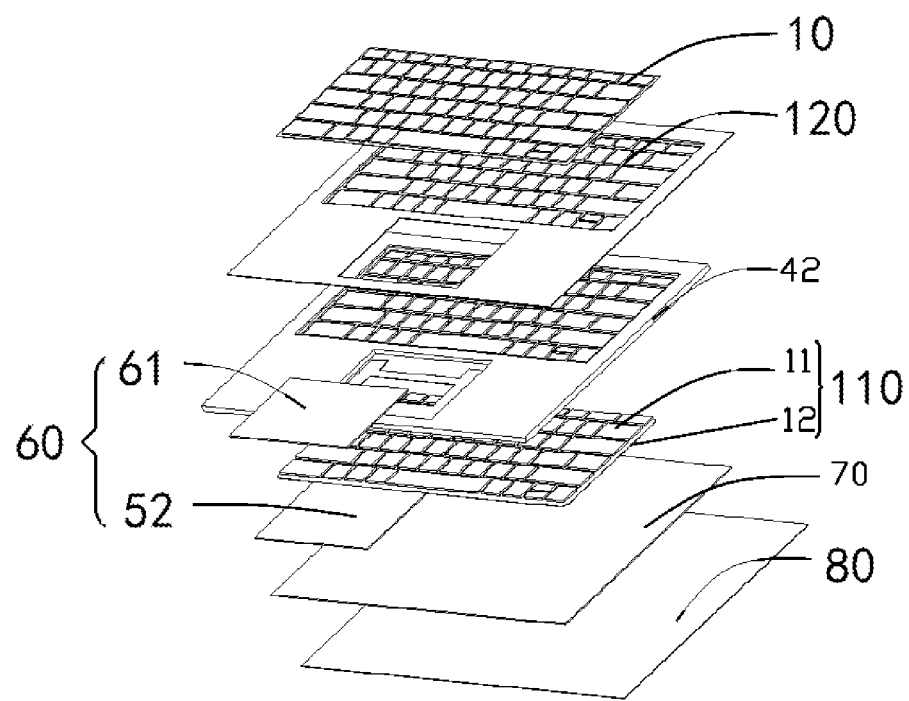
FIG. 4 shows an exploded view of the keyboard in FIG. 1.
Figure 7:
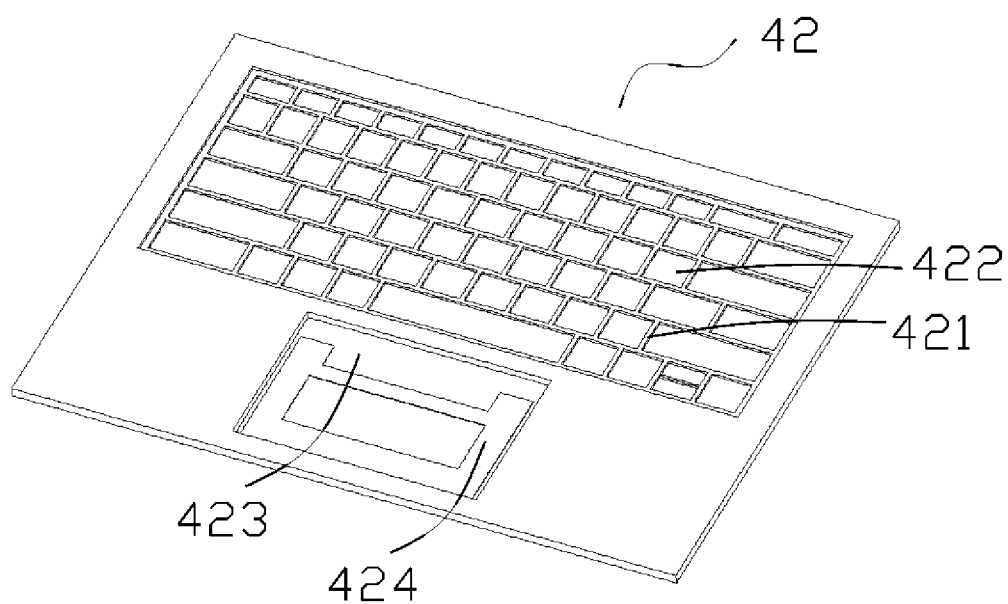
FIG. 7 shows a three-dimensional structure diagram of a support layer of the keyboard in FIG. 1.

As shown in FIG. 3, FIG. 4 and FIG. 7, in the technical solution of Embodiment 1, the keyboard further comprises a support assembly 130 comprising a support layer 42 provided between the keyboard body 112 and the body waterproof layer 120. The support layer 42 is bonded to the keyboard body 112. The support layer 42 comprises a net-shaped third accommodating structure 421. The third accommodating structure 421 forms a plurality of third through holes 422. The keycaps 20 are provided in one-to-one correspondence with the third through holes 422, and each keycap 20 may pass through the third accommodating structure 421 to be bonded to the first bonding part 11. The support layer 42 is used to support the body waterproof layer 120 and protect the keyboard body 112 inside the support layer 42, which plays a role of overall protection. The third accommodating structure 421 is provided in net-shape to provide support for the second accommodating structure 1212, while isolating the body waterproof layer 120 from the keyboard body 112. The keyboard body 112 is provided with electronic components, which are wrapped with the support layer 42 and isolated from the rest, which forms a certain seal, while providing more material choices for the body waterproof layer 120 to adapt to more waterproof materials with high plasticity, which may increase the design range of the overall appearance of the keyboard and reduce design restrictions. It should be noted that sizes of the first through hole 102 and the third through hole 422 are in a clearance fit with the corresponding keycap 20, so as to avoid the limitation of the use of the keycap 20 by the support layer 42 or the body waterproof layer 120.

Figure 8:
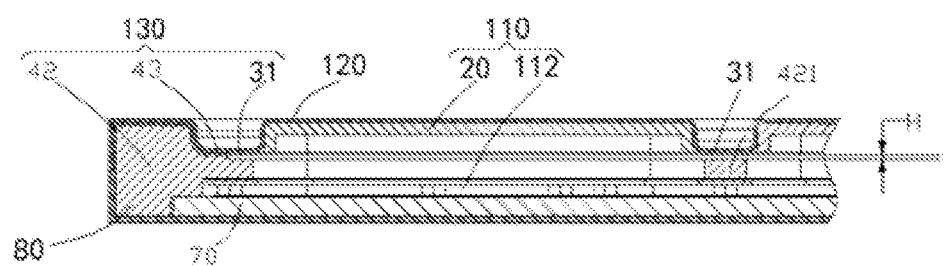
FIG. 8 shows a partial cross-sectional view of a keyboard provided in Embodiment 2 of the present disclosure.
Figure 9:
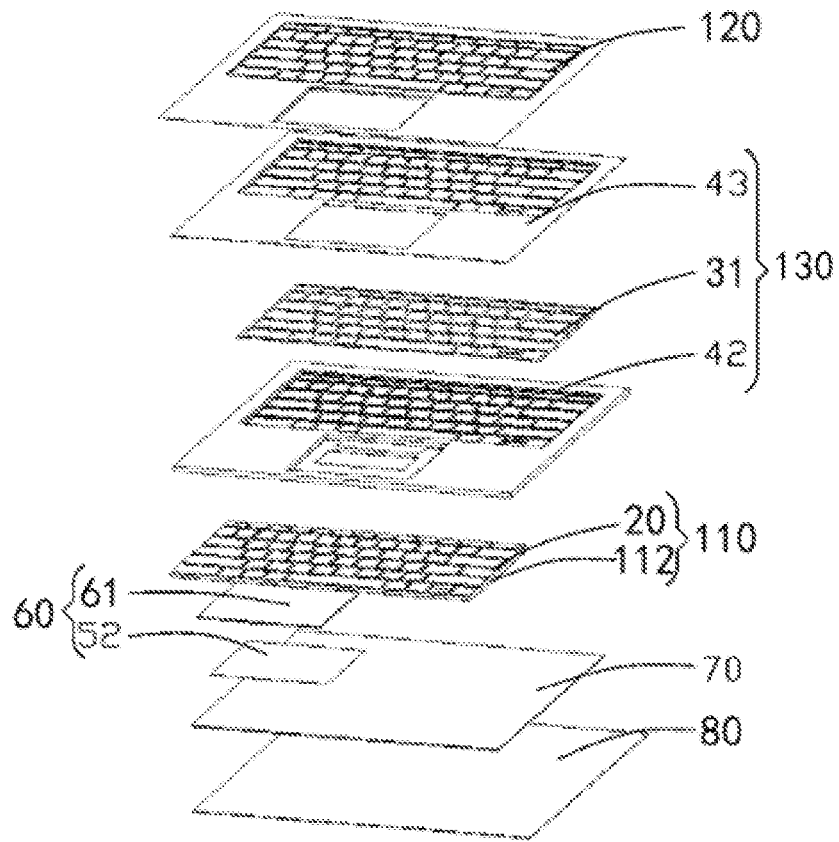
FIG. 9 shows an exploded view of the keyboard in FIG. 8.

As shown in FIG. 8 and FIG. 9, in the technical solution of Embodiment 2 provided by the present disclosure, the body waterproof layer 120 and the keycap waterproof layer 10 are integrally formed, the first accommodating structure 1211, the second accommodating structure 1212, the second bonding part 12 and the third bonding part 13 are integrally formed. The support assembly 130 further comprises a net-shaped first support structure 31. The first support structure 31 is bonded to the second bonding part 12. The first support structure 31 and the second bonding part 12 are both provided in a clearance between adjacent keycaps 20, and the first support structure 31 is an integrally formed structure. The bonding of the first bonding part 11 and the keycap 20 prevents sliding between the pressing area of the body waterproof layer 120 and the keycap 20, avoiding the movement of the keycap area of the body waterproof layer 120. Configuration of the first support structure 31 and the second bonding part 12 increases the structural strength of the body waterproof layer corresponding to the clearance between the keycaps 20 and increases the weight at the second bonding part 12. When the keycap 20 is pressed down, the pulling ability for the second bonding part 12 by the part 11 is greatly reduced, so that the position where the body waterproof layer 120 needs to be deformed is on the side wall of the keycap 20, which avoids the pulling of the waterproof layer of the adjacent keycap 20, thereby solving the related problem of the keyboard when pressing. The problem in the prior that when the body waterproof layer 120 of the keyboard is integrated, when the keycap is pressed, the surrounding keycaps will be affected, resulting in low keyboard input accuracy art is effectively solved.

It should be noted that the body waterproof layer 120 adopts an integrated structure to achieve the best waterproof performance. Such configuration may reduce the need for waterproof and dustproof treatment inside the keyboard, simplify the internal structure, and facilitate production. In this embodiment, bonding means that two components may be in contact with each other, but it is not limited whether the two components bonded to each other belong to a fixed connection. After the assembly is completed, the two bonded positions are compact in structure and are not easy to generate air bubbles. It is provided that when the keycap 20 is pressed, a certain clearance may be formed in the partially bonded area, so as to adapt to the deformation of the body waterproof layer 120 when the keycap 20 is pressed. The first support structure 31 is an integrally formed structure, which is beneficial to improve its own structural strength. Meanwhile, when the first support structure 31 is integrated, the tension effect on the second bonding part 12 in a single clearance may be increased, and the overall structure will make the second bonding part 12 further integrally formed, making the first bonding part 11 and the waterproof layer on the side of the keycap 20 separate independently, in some embodiments of the present disclosure, the interlocking of adjacent keycaps is avoided, improving an accuracy of keycap 20. Specifically, the first support structure 31 comprises a support skeleton 412, and a second through hole 411 is formed between the support skeleton 412 used for passing of the keycap 20, multiple second through holes 411 are formed and the second through hole 411 is in clearance fit with the corresponding keycap 20, the supporting frame 412 connects the entire second bonding part 12 to be integrally formed, which increases the deformation resistance of the second bonding part 12. Cooperating with the bonding of the first bonding part 11 and the top of the keycap 20, the deformation of the waterproof layer required for pressing down the keycap 20 are all applied to the waterproof layer on the side wall of the keycap 20, so that the waterproof layer of the adjacent keycap 20 will not be jointly pressed down, further ensuring typing accuracy.

Figure 10:
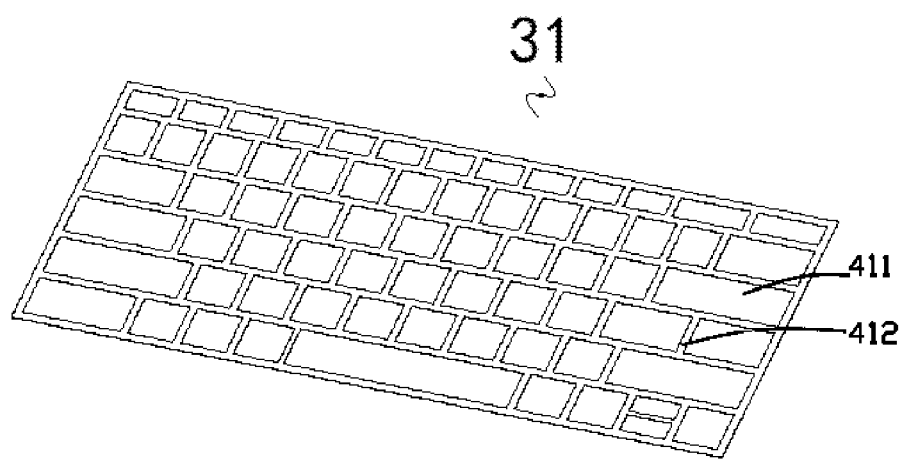
FIG. 10 shows a three-dimensional structure diagram of a first support structure of the keyboard in FIG. 8.

As shown in FIGS. 8 to 10, in the technical solution of embodiment 2, the support assembly 130 further comprises a support layer 42 provided between the first support structure 31 and the keyboard body 112, the support layer 42 is bonded to the keyboard body 112, and the keycap 20 may pass through the support layer 42 to bond with the first bonding part 11. The support layer 42 is used to isolate the keyboard body 112 from the first support structure 31.

As shown in FIG. 8, in the technical solution of embodiment 2, a fit clearance is provided between the first support structure 31 and the third accommodating structure 421, a height H of the fit clearance is in the range of 0.15 mm to 0.5 mm. The effect of providing the fit clearance is that when the first support structure 31 is glued under the second bonding part 12, such configuration makes the overall deformation resistance of the second bonding part 12 stronger, so that the deformation position of the body waterproof layer 120 is located between the first support structure 31 and the side wall of the keycap 20 under the pressing of the keycap 20, thereby preventing the second bonding part 12 from driving the adjacent keycap 20 to move, and avoiding a clearance between the body waterproof layer 120 and the keycap the keycaps 20, thereby improving the pressing accuracy and the pressing feel of the keycaps 20. It is noted that, the height of the fit clearance needs to be provided according to the actual pressing depth of the keycap 20. If the height of the fit clearance is too high, the deformation area of the body waterproof layer 120 will be too large, and the elastic deformation will fail, resulting in a risk of permanent deformation of the waterproof layer, meanwhile, the first support structure 31 is subjected to a relatively large force, and there is further a risk of damage. If the height of the fit clearance is selected to be low, the deformation area of the body waterproof layer 120 is relatively small, and the first support structure 31 is easily brought into contact with the parts below, which leads to the bottom parts in relative movement with the first support structure 31, where wear may occur. In this embodiment, the selected height of the fit clearance is 0.2 mm. On the one hand, the fit clearance provides a moving space for the first support structure, so that the first support structure 31 may push the second bonding part 12 downward, so that the bonding effect of the body waterproof layer 120 is better. On the other hand, the first support structure 31 has a certain amount of deformation, and providing the fit clearance may make the deformation amount of the first support structure 31 within the height range of the fit clearance, protecting the keyboard body 112 in some embodiments of the present disclosure. Such configuration may improve the comfort when using the keyboard. It should be noted that the clearances between the keycaps 20 are relatively deep, and when the body waterproof layer 120 is installed on the keycaps, adjacent keycaps 20 are easily driven by the keycaps during use. Therefore, the body waterproof layer 120 is pressed into the shape of the keyboard in a first step through the keyboard model, and the shape is fixed by the first support structure 31 in a second step, leaving a clearance of 0.2 mm between the first support structure 31 and the support layer 42, which is convenient for the keycap 20 to press and move up and down.

It should be noted that, in the technical solution of Embodiment 2, in order to ensure the hand feeling of the keycap 20 when pressed, the body waterproof layer 120 is made of a thin flexible material, and the thinner body waterproof layer 120 is pre-pressed into a keycap shape, afterwards, the bonding degree of the first bonding part 11 with the keycap 20 is better, and the better bonding avoids that there is a clearance between the pressing area of the body waterproof layer 120 and the keycap 20, solving the current problem that there is a clearance between the thick body waterproof layer 120 and the keycap 20 in the prior art and the hand feeling is poor. In an optional embodiment, the thickness of the body waterproof layer 120 ranges from 0.01 mm to 0.2 mm, such a thickness may provide a precise structure during the forming process, so as to facilitate subsequent keyboard assembly. The providing of the waterproof layer further needs to consider the actual pressing feel of the keycap 20. When the thickness of the body waterproof layer 120 is in the range of 0.01 mm to 0.1 mm, even if the body waterproof layer 120 is added to the keycap 20, the actual pressing feeling of the keycap 20 will not be affected, and this range is convenient for processing and production. In some embodiments of the present disclosure, when the thickness of the body waterproof layer 120 is in the range of 0.01 mm to 0.05 mm, the thickness of the body waterproof layer 120 is further reduced, so that when it is bonded to the keycap 20, its elasticity is relatively larger to better fit the size of the keycaps. Specifically, in this embodiment, the thickness is taken as 0.03 mm. Such configuration makes the thickness of the body waterproof layer 120 moderate, which may improve its flexibility, so as to bond with the keycap 20. Materials with higher flexibility may better adapt to the pulling when pressing the keycap 20, reducing the influence of the waterproof layer on the hand feeling of the keycap 20 when being pressed. The thinner the flexible material, the more difficult it is to process, and the higher the corresponding processing and production cost. The thicker the flexible material, the lower the processing difficulty and the higher the material cost. Therefore, a moderate thickness selection may balance the processing difficulty and production cost.

Figure 11:
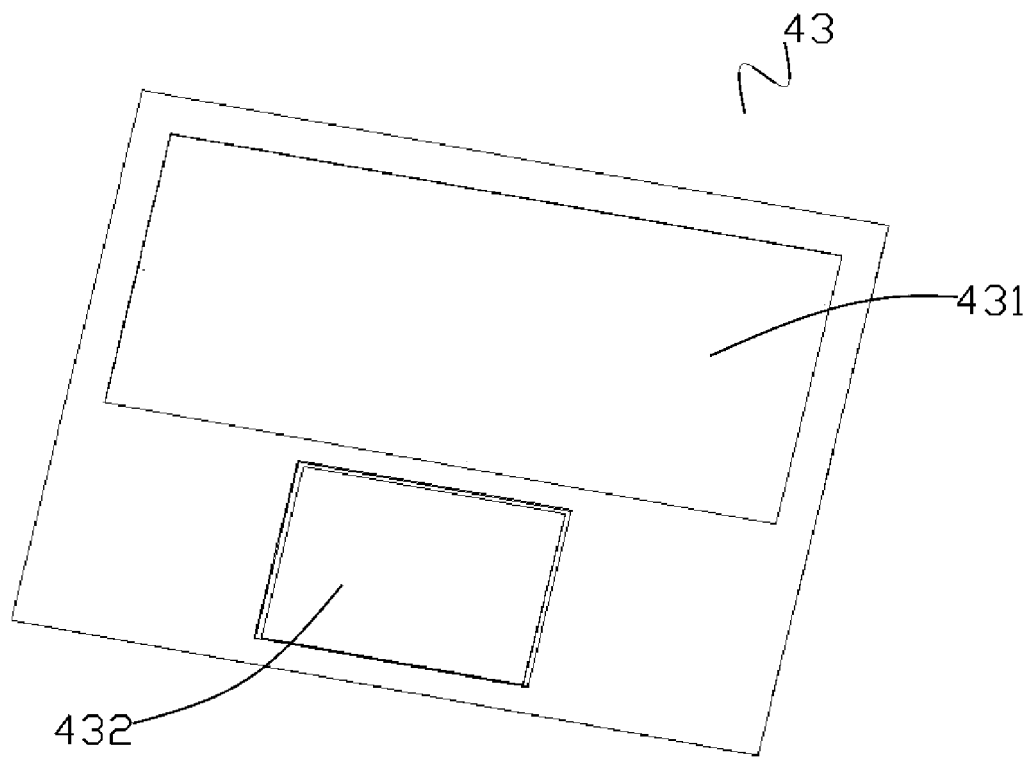
FIG. 11 shows a three-dimensional structure diagram of a buffer structure of the keyboard in FIG. 8.

As shown in FIG. 8, FIG. 9 and FIG. 11, in the technical solution of embodiment 2, the support assembly 130 further comprises a buffer structure 43 provided between the body waterproof layer 120 and the support layer 42, the buffer structure 43 comprises a first limiting part 431 surrounding the first support structure 31, and the buffer structure 43 is bonded to the support layer 42.

As shown in FIG. 8, FIG. 9 and FIG. 11, in the technical solution of this embodiment, the support assembly 130 further comprises a buffer structure 43 provided between the body waterproof layer 120 and the support layer 42, the buffer structure 43 comprises a first limiting part 431 and a second limiting part 432, the first limiting part 431 may surround the first support structure 31, and the buffer structure 43 is bonded to the support layer 42. The second limiting part 432 may surround part of the touch module 60, and the buffer structure 43 may be made of woven fabric, non-woven fabric, or formed soft rubber layer. Since the body waterproof layer 120 is made of a flexible material in order to increase the hand feeling of the keycap 20 when being pressed, and the thinner body waterproof layer 120 is highly elastic and easy to deform, the buffer structure 43 is provided for facilitating the forming of the body waterproof layer 120, while providing a certain degree of hardness so that the body waterproof layer 120 may be stretched better to achieve an aesthetic effect.

Figure 2:
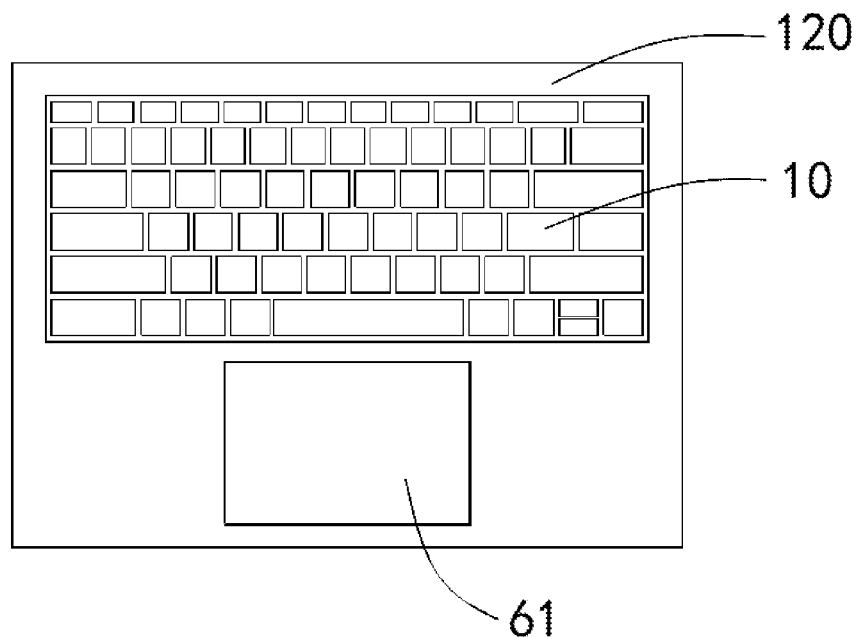
FIG. 2 shows a top view of the keyboard in FIG. 1.

As shown in FIG. 2, in the technical solution of embodiment 2, the keyboard further comprises a touch module 60, the support layer 42 further comprises a fourth accommodating structure 423, and the touch module 60 is provided in the fourth accommodating structure 423. The buffer structure 43 further comprises a second limiting part 432, the touch module 60 may partly pass through the second limiting part 432 to be connected with the body waterproof layer 120, and the position of the body waterproof layer 120 corresponding to the touch module 60 is provided with a touch part 122. Providing the touch module 60 is convenient for an electronic device to have the function of a mouse, and the electronic device may have more functions through the keyboard. When the keyboard is used as an external keyboard of a notebook computer, the decoration of the notebook computer may be reproduced by the touch module 60, avoiding the situation that the heat of the notebook computer affects the operation feel of the keyboard, and increasing the practicability of the keyboard. When the keyboard is used as an external keyboard of the tablet computer, the use function of the tablet computer may be increased. Most of the existing tablet computers may be installed with Microsoft's computer operating system, and the touch module 60 is provided to adapt to the above-mentioned computer operating system to turn the tablet computer into a notebook computer, such configuration makes the use of electronic device more functional, and there is more space for operation. The fourth accommodating structure 423 may completely accommodate the touch module 60, and realize the operation of the touch module 60 through the tactile transmission of the touch part 122 provided on the body waterproof layer 120.

As shown in FIG. 2, FIG. 6 and FIG. 7, in the technical solution of embodiment 2, the touch module 60 comprises a decorative panel 61 and a touch mainboard 52 connected with each other, the support layer 42 further comprises a mounting frame 424 provided in the fourth accommodating structure 423, the body waterproof layer 120 is provided with a touch part 122 at its position corresponding to the fourth accommodating structure 423. The decorative panel 61 is provided on the touching part 122, that is, the decorative panel 61 and the touch mainboard 52 are respectively provided on two sides of the touch part 122, the decorative panel 61 may be embedded in the cavity formed by the touch part 122, and the touch part 122 does not form a through hole, which is beneficial to the waterproof performance of the entire keyboard. The mounting frame 424 is provided in the fourth accommodating structure 423, the touch mainboard 52 is fixedly connected with the mounting frame 424, the touch mainboard 52 is in contact with a side of the touch part 122 away from the decorative panel 61, and the touch mainboard 52 is electrically connected with the keyboard body 112. The decorative panel 61 is made of a material with a certain hardness, for details, referring to the touch area of a notebook computer. The decorative panel 61 is assembled in an accommodating cavity formed by the touch part 122 and may be transitionally fitted with the touch part 122. Such configuration enables the decorative panel 61 to be able to support the touch part 122 to form a plane, so as to facilitate close contact between the bottom of the touch part 122 and the touch mainboard 52 located below the touch part 122, and the decorative panel 61 may further protect the touch mainboard 52 from being squeezed. The mounting frame 424 is used for positioning and installing the touch mainboard 52, the mounting frame 424 is closely coupled with the fourth accommodating structure 423 by means of fasteners or adhesives, so that parts of the touch module 60 has a compact structure. The second limiting part 432 is used for passing through the touch mainboard 52, and is used for the decorative panel 61 to pass the tactile sensation to the touch mainboard 52 through the thinner body waterproof layer 120, so as to avoid affecting the touch accuracy. Meanwhile, the second limiting part 432 may limit the circumferential position of the touch mainboard 52, thereby protecting the touch mainboard 52. The mounting frame 424 is closely coupled with the fourth accommodating structure 423 by means of fasteners or adhesives. The above-mentioned configuration makes the structure of the touch area of the keyboard compact. It should be noted that since the touch module 60 is provided, the keyboard forms a hand rest part between the keycap area and the touch module 60, and the hand rest part may play a role of supporting the root of the palm when using the keyboard and may support the hand while reducing the pressure of the hand on the keycap area, thereby improving the service life of the keyboard.

As shown in FIG. 2 and FIG. 3, in the technical solution of Embodiment 2, the keyboard further comprises a bottom waterproof layer 80, the bottom waterproof layer 80 wraps the keyboard module 110 and is bonded to the body waterproof layer 120, the body waterproof layer 120 is made of flexible material, and the bottom waterproof layer 80 is made of waterproof leather, textiles or nano-fabric material with a thickness more than 0.3 mm, so as to provide a certain hardness and elasticity to fit the user's hand, providing comfort. The first support structure 31 is made of hard materials such as PC, PET, PI, LCP or FR4. Since the body waterproof layer 120 is made of flexible materials, the entire body waterproof layer 120 is highly elastic and easy to deform. The first support structure 31 is made of a hard material with a certain weight, and the hardness of the hard material is relatively high, which may ensure that the structure of the second bonding part 12 of the body waterproof layer 120 is stable, so as to facilitate subsequent assembly with the keycap 20. The bottom waterproof layer 80 is used to waterproof the overall bottom of the keyboard, and is bonded to the body waterproof layer 120 to wrap the overall keyboard. Such configuration makes the keyboard a whole, and the upper surface of the keyboard is waterproof and dustproof through the body waterproof layer 120, the bottom is waterproof and dustproof through the bottom waterproof layer 80, and the side is waterproof and dustproof through the combination of the bottom waterproof layer and the body waterproof layer 120. Specifically, an adhesive may be provided between the bottom waterproof layer 80 and the body waterproof layer 120, or the two may be combined together by means of hot pressing, which may enhance the waterproof performance of the keyboard. Since the thick waterproof layer may be not bonded well with the keycap 20, a clearance will be formed between it and the keycap 20, the body waterproof layer 120 is made of flexible material which may easily form a shape of the keycap 20, which is easier to be bonded to the keycap 20, eliminating the clearance between the keycap 20 and the body waterproof layer 120, and improving the pressing feeling. The flexible material has a certain ability of elastic deformation to adapt to the operation of the keycap 20. The bottom waterproof layer 80 is made of waterproof leather, textiles or nano-fabric material, which has a high texture and a better touch and is more comfortable when the keyboard is transferred. The first support structure 31 is made of hard materials such as PC, PET, PI, LCP or FR4, specifically PC material, since flexible materials are not hard enough and are prone to deformation during assembly and pressing. Therefore, a hard first support material is used to support the flexible body waterproof layer. On the one hand, such configuration may endow the first support structure 31 with a certain hardness and weight, so as to realize the function of stretching the second bonding part 12 downward. On the other hand, the above-mentioned materials have a certain elastic deformation ability, which may better adapt to the deformation ability of the body waterproof layer 120 when the keycap 20 is pressed down. It should be noted that, in a keyboard with a waterproof layer, when the first support structure 31 is not provided, no matter the thickness of the waterproof layer, the waterproof layer on the side wall of the keycap 20 will appear sticky, joint pressing may occurred when the keycap 20 being pressed while being unsightly, which greatly affects the user's actual experience, and even affects the user's consideration of using the waterproof keyboard again. In some embodiments of the present disclosure, when the waterproof layer is made of a relatively thick material, the first support structure 31 may be provided to form a certain constraint for the thick material that is not easy to form, so that the waterproof layer may be bonded to the keycap 20 effectively, however, due to the low degree of deformation of the thicker material, there is a high probability that there will be an unformed part during molding, so that providing the first support structure 31 is likely to affect the waterproof layer of the keycaps 20 on both sides, under the force of the first support structure 31, then a joint reaction may occur. Although it may solve the problem of the degree of bonding between the waterproof layer and the keycap 20 to a certain extent, it may not completely solve the joint problem. Adopting a thinner waterproof layer and providing the first support structure 31 may avoid the problem of difficult molding, while it may better adapt to the deformation of the waterproof layer when the keycap 20 is pressed after the assembly is completed, and the deformation of the waterproof layer will not drive the first support structure 31 to affect the waterproof layer of the adjacent keycap 20, and the waterproof layer will not be involved. It should be noted that, in order to facilitate the isolation of the keyboard body 112 from the waterproof material, a bottom mounting plate 70 is provided between the keyboard body 112 and the bottom waterproof layer 80. Such configuration may play an isolation role, even if water enters the waterproof layer, the water further needs to be substantially detoured to affect the keyboard body 112, which is more conducive to the waterproof performance of the keyboard. In the above-mentioned keyboard configuration, the body waterproof layer is integrally formed, and its appearance design maintains the integrity of the waterproof layer to obtain a consistent appearance effect. The body waterproof layer 120 is made of a soft material to reduce the feeling effect of the waterproof layer on the pressing of the keycap 20 while ensuring waterproofing; the waterproof layer around the keycap 20 is not bonded to the keycap 20, and this part of the waterproof layer material may be moved flexibly to provide the stretching of the waterproof layer material required by the keycap the first support structure 31 is made of hard material so that the body waterproof layer 120 may adapt to the configuration of the keycap area, which may ensure the uniformity of the fit between the second bonding part 12 and the keycap 20, ensuring the keycap 20 has a consistent pressing feel. Meanwhile it may further provide a smooth and three-dimensional appearance visual effect for this part.

Figure 12:
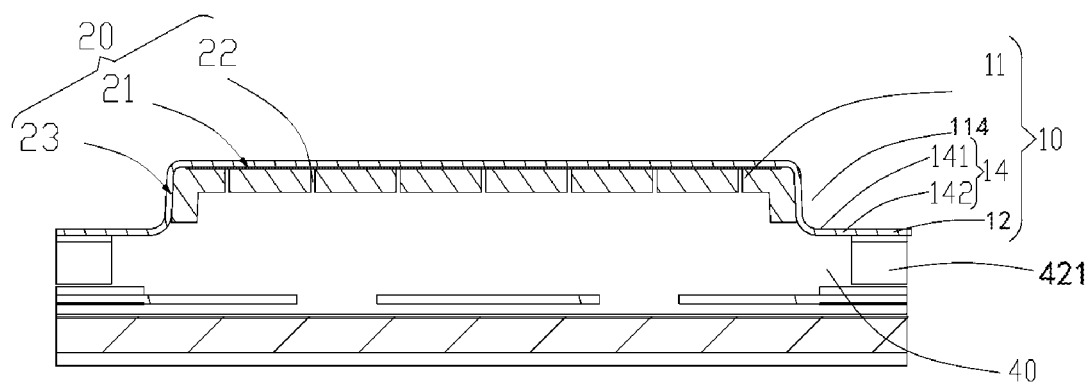
FIG. 12 shows a partial cross-sectional view of a keyboard of Embodiment 3 of the present disclosure.
Figure 13:
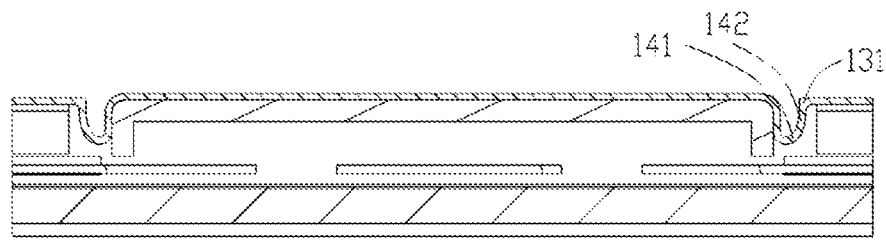
FIG. 13 shows a partial cross-sectional view of a keycap of the keyboard in FIG. 12 in a pressed state.
Figure 14:
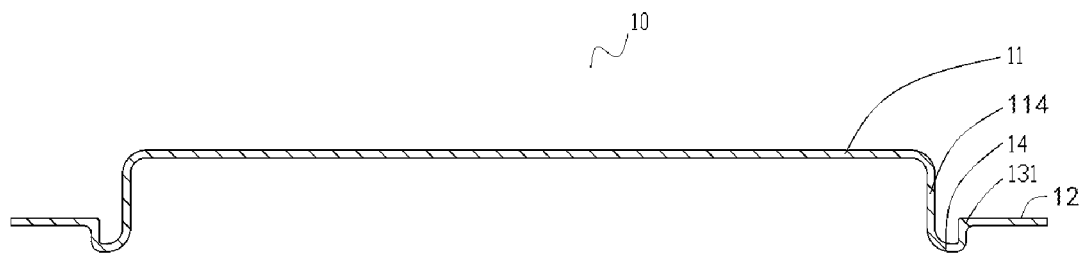
FIG. 14 shows a partial cross-sectional view of a keycap waterproof layer of the keyboard in FIG. 12.

As shown in FIGS. 12 to 14, Embodiment 3 of the present disclosure provides a keyboard, comprising: a keycap waterproof layer 10, a keycap 20, and a support assembly 130, the keycap waterproof layer 10 comprises a first bonding part 11, a second bonding part 12, a third bonding part 13 and a fourth bonding part 114; the keycap 20 comprises a pressing surface 21, a keycap through hole 22 and a keycap side wall 23, the opening of the keycap through hole 22 is provided on the pressing surface 21, the first bonding part 11 is bonded to the pressing surface 21, and the keycap side wall 23 is bonded to the fourth bonding part 114; the third accommodating structure 421 is bonded to the second bonding part 12, an accommodating clearance 40 is provided between the third accommodating structure 421 and a vertical plane where the bottom lateral side of the adjacent keycap 20 is located. When the keycap 20 is pressed, a deformation region of the keycap waterproof layer 10 is located in the accommodating clearance 40. The first bonding part 11, the fourth bonding part 114 and the second bonding part 12 may completely cover the keyboard to achieve the purpose of waterproofing. Providing the keycap through hole 22 is facilitated for the air between the pressing surface 21 and the first bonding part 11 to discharge, so that the coupling between the pressing surface 21 and the first bonding part 11 may be more closely. The accommodating clearance 40 may accommodate the deformation area of the keycap waterproof layer 10 when the keycap 20 is pressed down, avoiding the deformation of the keycap waterproof layer 10 from affecting the adjacent keycaps 20, while the deformed keycap waterproof layer 10 may be accommodated, which avoids affecting the pressing feeling of the keycap 20 and improves the experience of using the keyboard. The position of the keycap waterproof layer 10 is the same as before and after the keycap 20 is pressed, avoiding the situation that the keycap waterproof layer 10 fails to return to its original position due to deformation, thereby improving the service life of the keyboard. The problem in the prior art that the deformation of the waterproof layer of the keyboard affects the pressing feel of the keyboard is effectively solved. It should be noted that there are multiple keycaps 20 to cope with the use of the keyboard. FIG. 12 and FIG. 13 are only the assembly diagrams of a single keycap 20, and an elastic member is provided under the keycap 20 to make the keycap 20 return after the pressing. It should be noted that the top end of the accommodating clearance 40 is the bonding surface of the second bonding part 12 and the support layer 42. In this embodiment, bonding means that two components may be in contact with each other, but it is not limited whether the two components bonded to each other belong to fixed connection. After the assembly is completed, the two bonded positions are compact in structure and are not easy to generate air bubbles.

As shown in FIGS. 12 to 14, in the technical solution of embodiment 3, the deformed area is the deformation part 14 of the keycap waterproof layer 10, and the deformation part 14 is respectively connected with the fourth bonding part 114 and the second bonding part 12. When the keycap 20 is pressed, the deformation part 14 may be fully accommodated in the accommodating clearance 40. The deformation part 14 is used for the deformation of the keycap waterproof layer 10 when it is pressed down. This configuration may control the deformation of the keycap waterproof layer 10 within the deformation part 14, while it may further avoid the bonding between the fourth bonding part 114 and the keycap side wall 23 from being destroyed, so that the fourth bonding part 114 falls off from the keycap side wall 23.

As shown in FIGS. 12 to 14, in the technical solution of embodiment 3, the deformation part 14 comprises a curving section 141 and a bending section 142, the curving section 141 is provided between the bending section 142 and the fourth bonding part 114, and the bending section 142 is connected with the second bonding part 12. In some embodiments of the present disclosure, the deformation part 14 is divided into a curving section 141 and a bending section 142, the deformation amount of the deformation part 14 close to the fourth bonding part 114 is larger and the deformation position changes more, thus providing the curving section 141 may adapt to a wider range of deformation, while the bending section 142 may be connected with the second bonding part 12 to play a certain role of supporting connection and avoiding the deformation part 14 from driving the second bonding part 12 to fall off. The bending section 142 is provided so that the second bonding part 12 is far away in the deformed area, and the bonding of the second bonding part 12 will not be affected.

As shown in FIG. 12 to FIG. 14, in the technical solution of embodiment 3, the bending section 142 may rotate around a connection point 131 between the bending section 142 and the second bonding part 12. The connection point 131 and the bending section 142 rotating around the connection point 131 between the bending section 142 and the second bonding part 12 are provided so that the bending section 142 changes the positional relationship with the second bonding part 12 by rotation, avoiding the second bonding part 12 to be subjected to a stretching force caused by stretching deformation which may result in falling off As shown in FIGS. 12 to 14, in the technical solution of embodiment 3, the connection point 131 is provided at a position where the second bonding part 12 extends along a direction close to the keycap, so that the bending section 142 may rotate at a large angle. This configuration makes the curving section 141 be located in the accommodating clearance 40 when the keycap 20 is pressed and may be stretched. The state of the curving section 141 is avoided from being deformed and compressed all the time, and the long-term deformation of the curving section 141 which may result in failure of the curving section 141 may be avoided, thereby improving the long-term use of the keycap waterproof layer 10. As shown in FIGS. 12 to 14, in the technical solution of embodiment 3, when the keycap 20 is not pressed, the deformation part 14 is located outside the accommodating clearance 40. Such configuration makes the deformation part 14 completely above the accommodating clearance 40, making the accommodating clearance 40 invisible when the keycap 20 is not pressed and improving the visual effect of the overall appearance of the keyboard. Water accumulation at the accommodating clearance 40 is avoided in terms of waterproof performance.

As shown in FIGS. 12 to 14, in the technical solution of embodiment 3, when the keycap 20 is not pressed, the bending section 142 and the second bonding part 12 are located in the same plane, the curving section 141 is arc-shaped and is located on a side of the plane close to the keycap 20. The arc-shaped curving section 141 makes the keycap waterproof layer 10 of the keyboard integrally formed when viewed from above, avoids the appearance of gully lines, and is conducive to the formation of clusters when designing the appearance. The bending section 142 and the second bonding part 12 are located in the same plane, and such configuration may further hide the connection point, so that the effect of the overall presentation is obvious, and materials may be reduced. The arrangement of the above-mentioned keyboard does not require a more stable structure of the keyboard under the premise of stable waterproof performance.

It should be noted that, in the technical solution of embodiment 3, the keycap waterproof layer 10 needs to be pre-pressed into the shape of the keycap 20 before assembly, as shown in FIG. 14, after the assembly is completed, the assembly effect of the keycap waterproof layer 10 and the keycap 20 formed is shown in FIG. 13 and FIG. 14. When the keycap 20 is not pressed, the keycap lifts up the waterproof layer around the entire keycap 20, thereby realizing the effect of hiding the accommodating clearance 40 of the keycap 20 under normal conditions and further enhancing the appearance effect. When the keycap is pressed, the deformation part 14 may be fully accommodated in the accommodating clearance 40. The deformation part 14 not only provides the stretching length of the waterproof layer required for pressing the keycap 20, but further simultaneously guides the downward function of the waterproof layer of the keycap sidewall 23, thereby maintaining the integrity of the appearance; the depth of the deformation part 14 formed initially is relatively small, the waterproof layer has a downward resilience before the keycap 20 is pressed, so that the waterproof layer may still be tightly bonded to the keycap 20 under a quick pressing operation, which further enhances the product appearance effect in the operating state and improves the pressing feeling of the keyboard.

Figure 15:
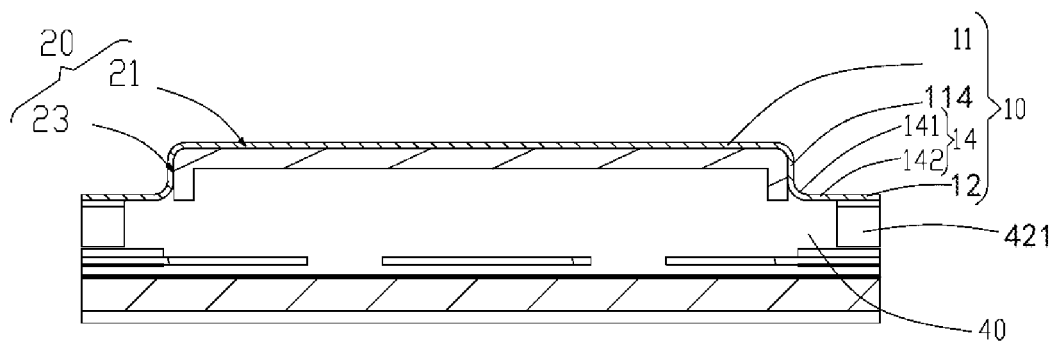
FIG. 15 shows a partial cross-sectional view of a keyboard provided in Embodiment 4 of the present disclosure.
Figure 16:
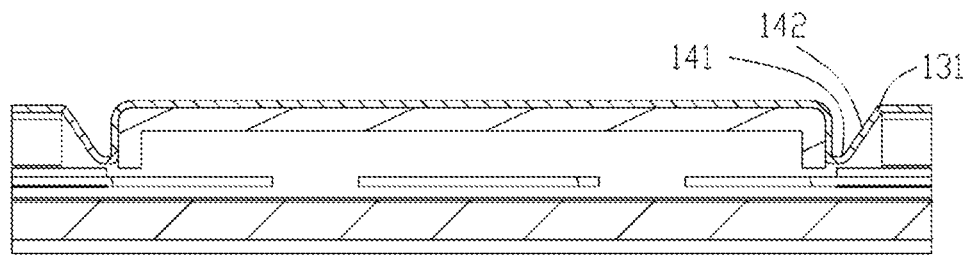
FIG. 16 shows a partial cross-sectional view of a keycap in the keyboard in FIG. 15 in a pressed state.

It should be noted that, as shown in FIG. 15 and FIG. 16, in the technical solution of embodiment 4, the difference from the technical solution of embodiment 3 is that the connection point 131 of embodiment 4 is provided on a corner of the support layer 42, such configuration may further reduce the length of the bending section 142, and may reduce the material of the keycap waterproof layer 10. When the keycap waterproof layer 10 is made of a softer material, such configuration is more conducive for the molding of the keycap waterproof layer 10. The keycap waterproof layer 10 in the present disclosure is integrally formed. The advantage of such configuration is that the waterproof performance is strong, while it may avoid the complicated structure of the keyboard due to the waterproof design, and is further conducive for reducing the overall thickness of the keyboard.

Figure 17:
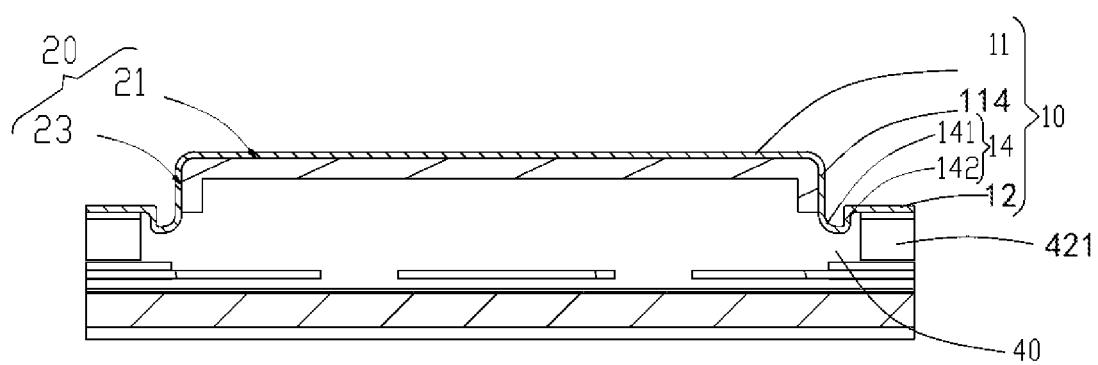
FIG. 17 shows a partial cross-sectional view of a keyboard provided in Embodiment 5 of the present disclosure.
Figure 18:
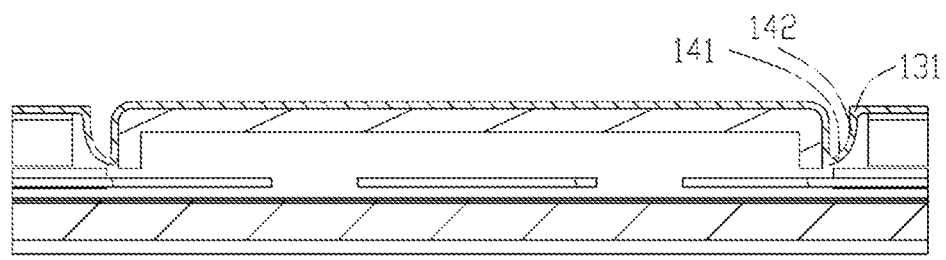
FIG. 18 shows a partial cross-sectional view of a keycap in the keyboard in FIG. 17 in a pressed state.
Figure 19:
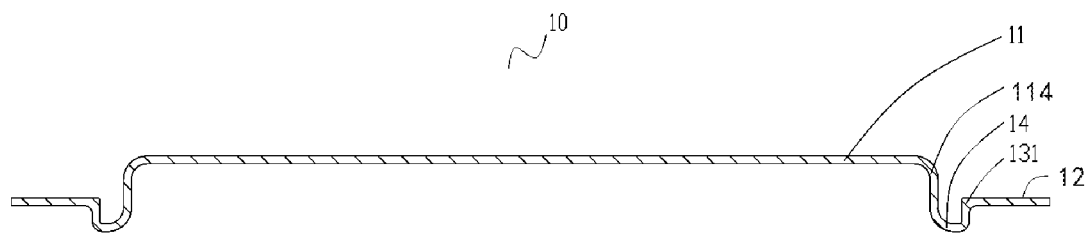
FIG. 19 shows a partial cross-sectional view of a keycap waterproof layer of the keyboard in FIG. 17.

As shown in FIGS. 17 to 19, in the technical solution of embodiment when the keycap 20 is not pressed, at least part of the deformation part 14 is located in the accommodating clearance 40. The difference between embodiment 5 and embodiment 3 is that the keycap waterproof layer 10 is provided with a redundant deformation part 14, that is, the curving section 141 and the bending section 142 are lengthened to a certain extent, such configuration may completely avoid the second bonding part 12 and the fourth bonding part 114 from falling off, which may effectively increase the service life of the keycap waterproof layer 10.

As shown in FIGS. 17 to 19, in the technical solution of embodiment when the keycap 20 is not pressed, the fourth bonding part 114 is completely bonded to the keycap side wall 23. In some embodiments of the present disclosure, the fourth bonding part 114 may be completely bonded to the keycap side wall 23, which increases the degree of bonding between these two as much as possible, thus better preventing the fourth bonding part 114 from falling off from the keycap side wall 23. It should be noted that, in the technical solution of embodiment 5, the connection point 131 is provided outside the second bonding part 12, such configuration makes the curving section 141 be located in the accommodating clearance 40 when the keycap 20 is pressed, and may obtain a stretched state, avoiding the curving section 141 from always being in a state of deformation and compression, and may avoid long-term deformation of the curving section 141 which may result in failure of the curving section 141, thereby improving the life of long-term use of the keycap waterproof layer 10. It should be noted that, in the technical solution of Embodiment 5, the keycap waterproof layer 10 needs to be pre-pressed into the shape of the keycap 20 before assembly, as shown in FIG. 19. After the assembly is completed, assembly effect of the keycap waterproof layer 10 and the keycap 20 formed is shown in FIG. 17 and FIG. 18. When the keycap 20 is not pressed, the keycap waterproof layer 10 assembled is only placed on the keycap 20 without any other interaction force. The deformation part 14 not only provides the stretching length of the keycap waterproof layer 10 required for pressing the keycap 20, but further simultaneously guides the waterproof layer of the keycap sidewall 23 downward, thereby maintaining the integrity of the appearance.

Figure 20:
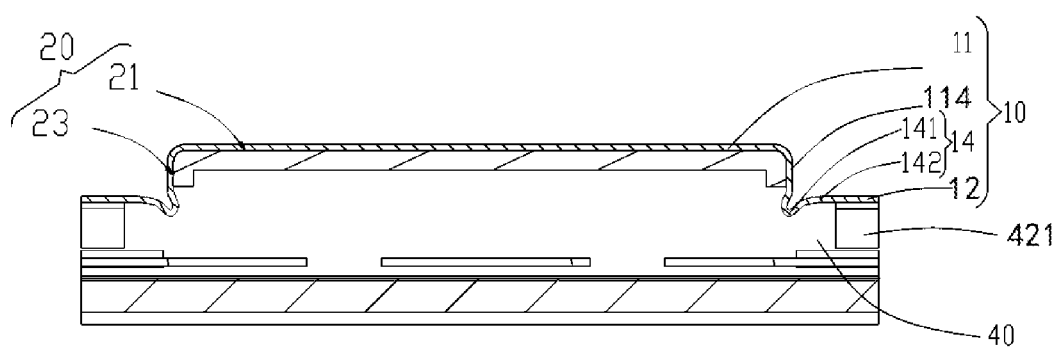
FIG. 20 shows a partial cross-sectional view of a keyboard provided in Embodiment 6 of the present disclosure.
Figure 21:
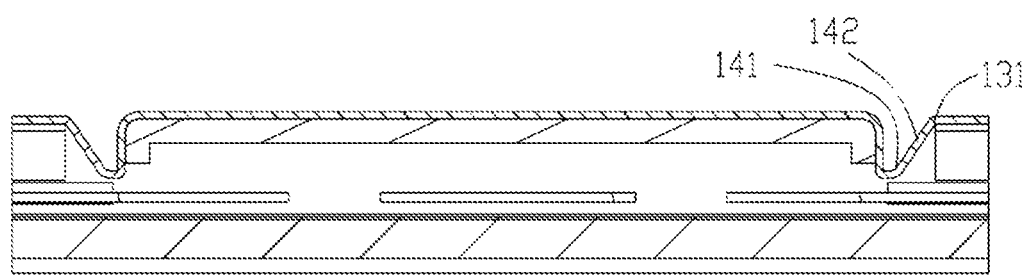
FIG. 21 shows a partial cross-sectional view of a keycap in the keyboard in FIG. 20 in a pressed state.

It should be noted that the present disclosure further provides Embodiments 6 and 7. As shown in FIG. 20 and FIG. 21, in the technical solution of Embodiment 6, when the keycap 20 is not pressed down, the curving section 141 of the deformation part 14 is under the keycap 20, such configuration further increases the length of the deformation part 14 to ensure that the bonding of each part will not be affected by pulling, which is beneficial to increase the actual service life of the keyboard itself.

Figure 22:
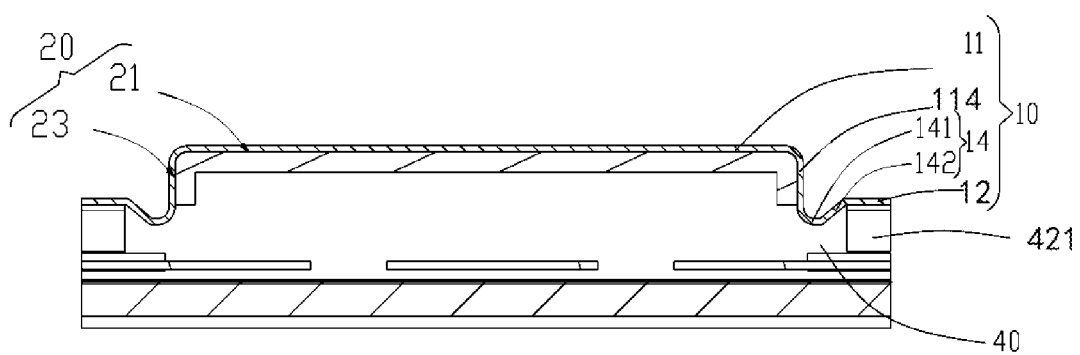
FIG. 22 shows a partial cross-sectional view of a keyboard provided in Embodiment 7 of the present disclosure.
Figure 23:
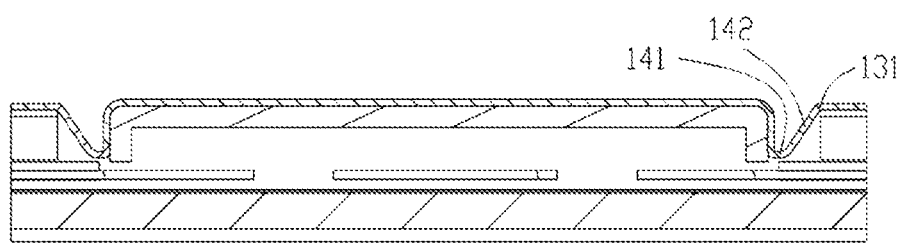
FIG. 23 shows a partial cross-sectional view of a keycap in the keyboard in FIG. 22 in a pressed state.

As shown in FIG. 22 and FIG. 23, in the technical solution of embodiment 7, the difference between embodiment 7 and embodiment 5 is that the position of the connection point 131 is the same as that of embodiment 4. The curving section 141 and the bending section 142 is lengthened to a certain extent. Such configuration may completely prevent the fourth bonding part 114 and the second bonding part 12 from falling off, and may further reduce the use of materials to a certain extent and reduce production costs.

Figure 24:
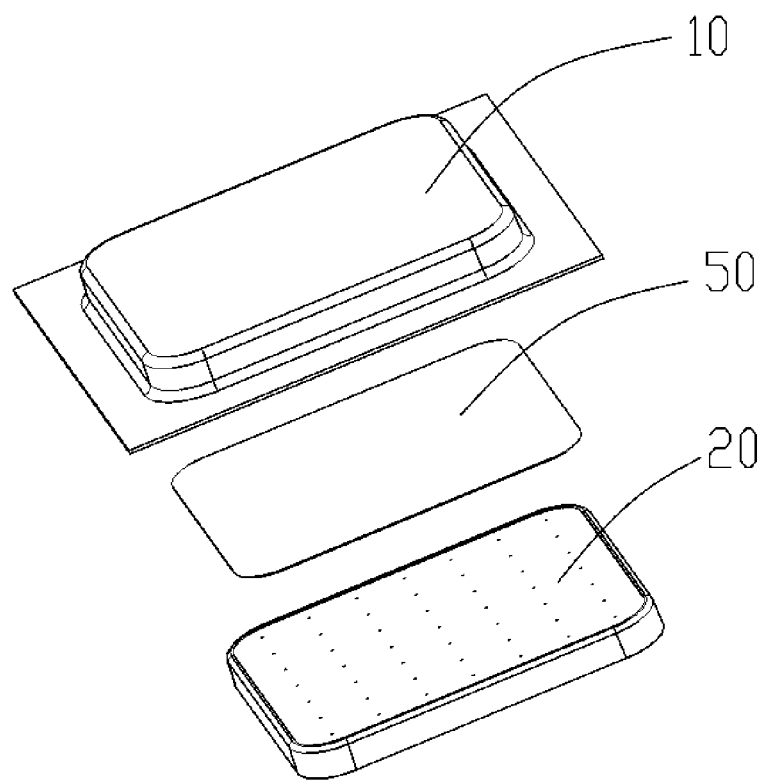
FIG. 24 shows a schematic diagram of assembly of a keycap provided in Embodiment 8 of the present disclosure.
Figure 25:
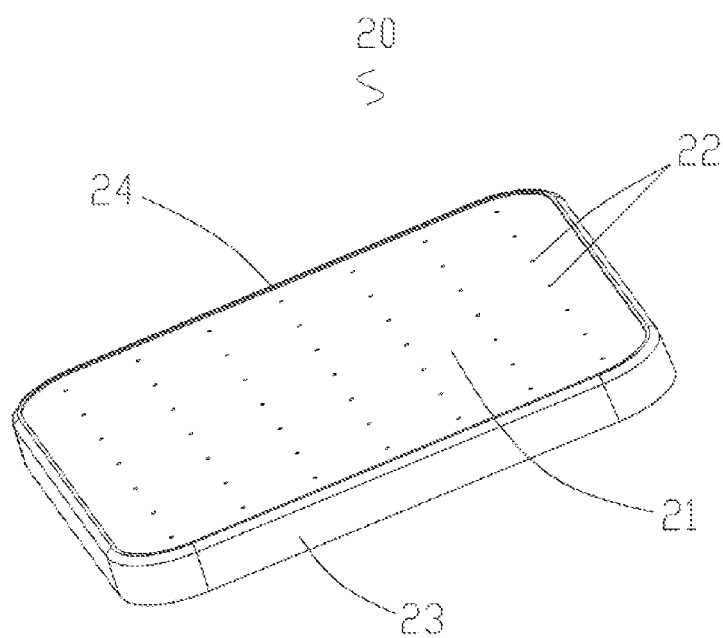
FIG. 25 shows a three-dimensional structure diagram of the keycap in FIG. 24.
Figure 26:
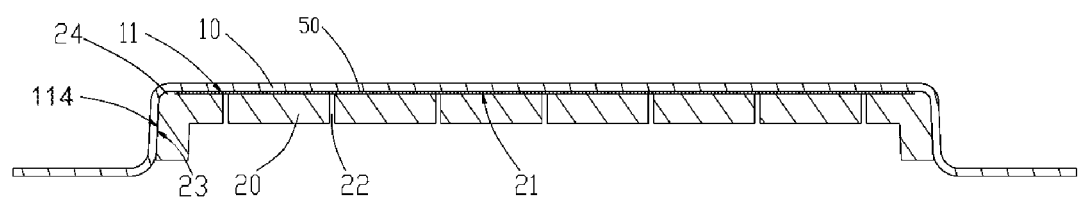
FIG. 26 shows a cross-sectional view of a keycap provided in a technical solution of Embodiment 8 of the present disclosure.

As shown in FIG. 24 to FIG. 26, in technical solutions of embodiment 8 of the present disclosure, the keyboard in embodiment 8 is improved based on the technical solutions in embodiments 3 to 7, the keyboard further comprises an adhesive layer 50 provided between the pressing surface 21 and the first bonding part 11, the adhesive layer 50 is bonded to the pressing surface 21 and the first bonding part 11 respectively, There are a plurality of keycap through holes 22, and the central axis of each keycap through hole 22 is extended along a direction perpendicular to the pressing surface 21. Such configuration makes the angle relationship between the side wall of the keycap through hole 22 and the pressing surface 21 constant and the fit between the adhesive layer 50 and the keycap through hole 22 uniform, and angles formed by the side wall of the keycap through hole 22 and the pressing surface are equal, so that the risk of puncturing the adhesive layer 50 will not be caused, while the adhesive layer 50 may be better bonded.

It should be noted that, in technical solutions of embodiment 8, the pressing surface 21 may be flat, which is suitable for thin and light keyboards, the pressing surface 21 may further adapt to the curved surface of fingers, which is suitable for thicker keycaps 20. The curved surface may improve the tactile feeling when the keycap 20 is in contact with the finger. Such configuration results in a certain clearance between the keycap 20 and the keycap waterproof layer 10, which would easily lead to insufficient adhesion of the waterproof layer, so that there are air bubbles between the waterproof layer and the keycap 20, which seriously affects the user experience when the keycap 20 is pressed. The keycap waterproof layer 10 adopts an integrated structure to cover the entire keycap area to achieve the best waterproof performance. Such configuration may reduce the need for waterproof and dustproof treatment inside the keyboard, simplify the internal structure and facilitate production. The keycap waterproof layer 10 is made of a material with certain flexibility, specifically, the material comprises flexible materials such as PU, TPU, TPE, LSR, silica gel, Rubber, etc.; the adhesive layer 50 can be made of double-sided tape which is easy to obtain and facilitated for production and processing.

As shown in FIG. 25, in one technical solution of embodiment 8, a cross section of the keycap through hole 22 is circular, and a maximum size of the cross section of the keycap through hole 22 is in the range of 0.05 to 0.2 mm. The circular keycap through hole 22 reduces the risk of the adhesive layer 50 being pierced in some embodiments of the present disclosure, while the circular through hole is convenient for processing, and the structural strength of the circular through hole is relatively strong comparing with other shapes. The hole diameter is 0.05 to 0.2 mm, which is used for discharging where the adhesive layer 50 being attached to and contracted with the pressing surface 21, so as to improve the yield of attachment; meanwhile, the small hole diameter of the micro through hole will not show any traces on the appearance; the through hole may be realized by means of post-process CNC, laser, electric discharge and other processing, or mold forming.

As shown in FIG. 26, in the other technical solution of embodiment 8, the hole wall of the keycap through hole 22 is provided in a straight line along the direction of the central axis. Such configuration makes it easy to process the keycap through hole 22 from the pressing surface 21, and may further end on the pressing surface 21, which may reduce the processing requirements of the keycap through hole 22. This reduces the overall structural strength of the keycap 20 and leads to the risk of damage.

Figure 27:
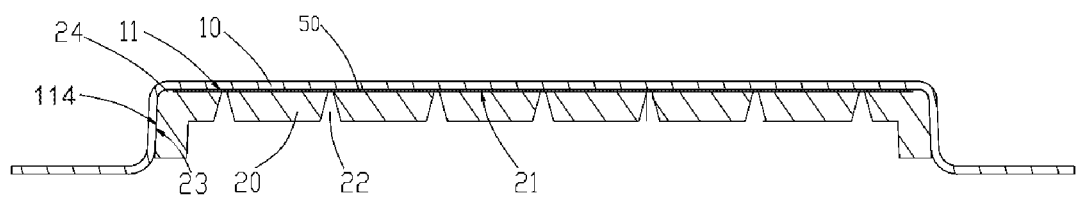
FIG. 27 shows a cross-sectional view of a keycap provided in a technical solution of Embodiment 8 of the present disclosure.

As shown in FIG. 27, in another optional embodiment, the keycap through hole 22 on the keycap 20 extends in a direction away from the central axis of the pressing surface, and the wall of the keycap through hole 22 gradually moves away from the central axis. Such configuration enables the keycap through hole 22 to eliminate more material and reduce the overall weight; meanwhile, it may fasten discharging when the adhesive layer 50 is applied. In addition, when the adhesive layer 50 is liquid glue, the glue that enters the keycap through hole 22 will form a conical solid after solidification. Since the diameter of the hole on the pressing surface 21 is small, the formed solid may not pass through. The adhesive layer 50 is thereby integrated with the keycap 20 and may not be separated, such configuration effectively improves the service life of the keycap. It should be noted that the keycap through hole 22 may be realized by post-process CNC, laser, electric discharge and other processing, or mold forming. It should be noted that part of the keycap through hole 22 may have the hole wall provided in a straight line along a direction of the central axis, and part of the hole wall may be provided gradually away from the central axis. The combination may not only realize the entry of liquid glue to form a limit, but further realize discharging.

On the basis of the above-mentioned embodiments, Embodiment 8 of the present disclosure is further improved. The keycap 20 further comprises a limiting part 24 surrounding the pressing surface 21 to form an accommodating cavity for the adhesive layer 50. Such configuration enables the adhesive layer 50 to be limited within a certain range, which is convenient for assembly; meanwhile, the configuration of the limiting part 24 may prop up the pressing surface 21 area to obtain the keycap waterproof layer 10. The uneven thickness causes the first bonding part 11 is not smooth enough after the keycap waterproof layer 10 is bonded is thereby avoided. In some embodiments of the present disclosure, in order to increase the flatness of the first bonding part 11 and the connection effect between the adhesive layer 50 and the first bonding part 11, liquid glue may further be filled around the bonding layer 50. After the liquid glue is solidified, the adhesive layer 50 is integrated with the keycap 20, when it is bonded to the first bonding part 11, defects such as air bubbles will not be formed between the first bonding part 11. Such configuration may further reduce the processing accuracy of the adhesive layer 50, which is more suitable for production.

In the technical solutions of embodiment 8, the adhesive layer 50 may be a sheet adhesive and be respectively bonded to the first bonding part 11 and the pressing surface 21. The sheet-shaped adhesive of the adhesive layer is generally arc-shaped to correspond to the configuration of the keycap 20, and the sheet-shaped adhesive is more suitable for installation in the limiting part 24. The sheet-shaped adhesive means that it is generally in the shape of a sheet, specifically a double-sided adhesive layer, which may directly bond with the first bonding part 11 and the pressing surface 21. When the keycap 20 conforms to the pressing of fingers so that the pressing surface 21 is arc-shaped, the pressing surface 21 may be bonded to the sheet-shaped adhesive to make the pressing feeling better. It should be noted that the thickness of the double-sided adhesive layer is selected to be the same as the depth of the accommodating cavity formed by the limiting part 24, so as to achieve better adhesion. The adhesive layer 50 may further be selected as liquid glue, and part of the liquid glue enters the keycap through hole 22. Specifically, the liquid glue may adopt glue with relatively large viscous resistance, so that the glue may partially enter the keycap through hole 22, and completely solidify to form a column before passing through the keycap through hole 22, the column is fixedly connected with a side wall of the keycap through hole 22, which may increase the connection effect of the adhesive layer 50, so that the entire adhesive layer 50 is completely fixed with the keycap 20. It should be noted that the adhesive layer 50 may be bonded to various adhesives, such as liquid glue coupled with a sheet-shaped adhesive, as long as it may achieve a firm bonding effect and a discharging effect.

In the above embodiment 8, the keycap 20 further comprises an additional through hole, the keycap waterproof layer 10 further comprises a fourth bonding part 114, the additional through hole is provided on the keycap side wall 23 of the keycap 20, the fourth bonding part 114 is bonded to the keycap side wall 23 through liquid glue, and part of the liquid glue enters into the additional through hole. The additional through hole is provided on the keycap side wall 23 to facilitate the bonding of the fourth bonding part 114 and the side wall of the keycap 20, and liquid glue may be used as a bonding substance to completely fix the entire adhesive layer 50 on the keycap 20, while the keycap through hole 22 and the additional through hole are provided in different directions, so that there is a staggered structural force between the adhesive layer and the keycap 20, which may effectively prevent the adhesive layer 50 from falling off from the keycap 20, thereby improving the actual service life of the adhesive layer 50.

Figure 28:
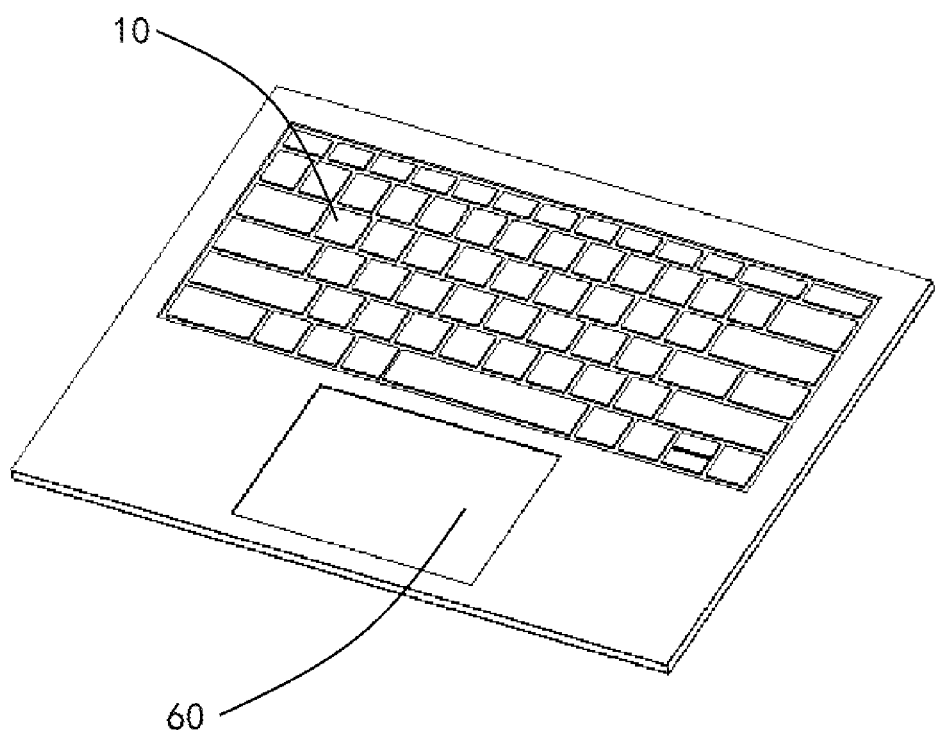
FIG. 28 shows a three-dimensional structure diagram of an electronic device of Embodiment 9 of the present disclosure.
Figure 29:
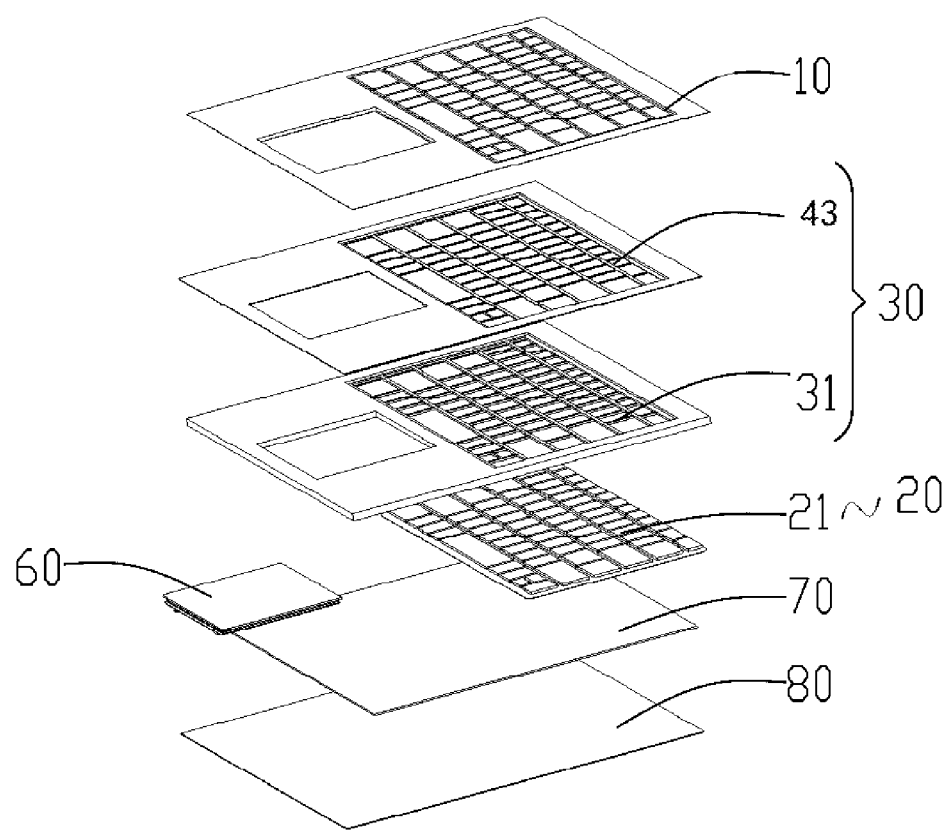
FIG. 29 shows an exploded view of the electronic device in FIG. 28.
Figure 30:
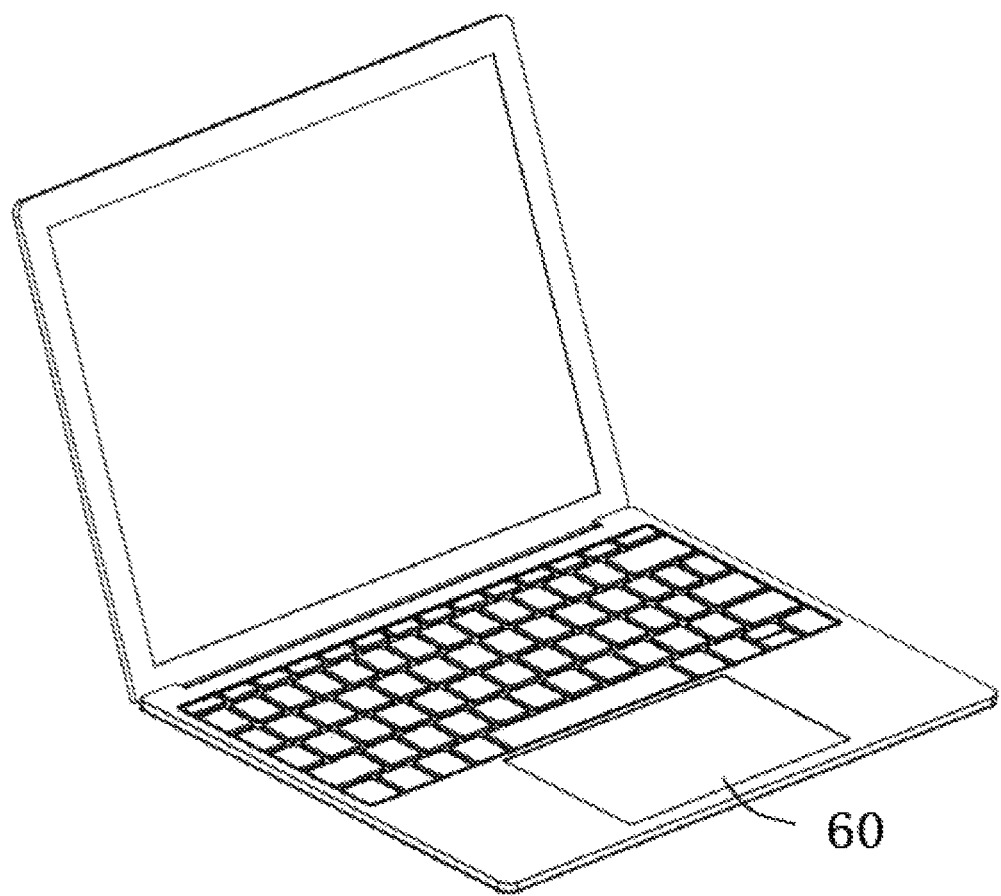
FIG. 30 shows a three-dimensional structure diagram of an electronic device of Embodiment 10 of the present disclosure.

As shown in FIG. 28 and FIG. 29, in the technical solution of Embodiment 9 of the present disclosure, an electronic device is provided, the electronic device comprises a keyboard and a device body, and the keyboard is a keyboard of any one of Embodiment 3 to Embodiment 8, the keyboard is connected with the device body by signal. The keyboard provided in this way may ensure the integrity of the appearance of the waterproof layer bonded to the keycap, and the keycap through hole 22 is processed on the keycap 20 to ensure exhausting gas when the first bonding part 11 is bonded to the pressing surface 21. Meanwhile, the micropores are extremely small in diameter, and there is no trace on the appearance. The keyboard is connected with the device body by signal. The electronic device may be a notebook computer, a tablet device or other electronic devices. The above-mentioned keyboard that is connected with by signal may serve the electronic device to realize the function of the keyboard. The keyboard is easy to carry and transfer, and has good waterproof and dustproof capabilities, suitable for harsh environments and able to cope with various living environments. It should be noted that the way of signal connection may be wireless signal connection, such as Bluetooth and other means of wireless signal connection.

It should be noted that, in the technical solution of embodiment 9, the keyboard further comprises a buffer structure 43, a touch module 60, a bottom mounting plate 70 and a bottom waterproof layer 80, the keycap 20 is provided on the keyboard module, the keyboard module and the touch module 60 are both provided on the bottom mounting plate 70; the buffer structure 43 is provided between the keycap waterproof layer 10 and the support layer 42. Since the keycap waterproof layer 10 is made of flexible material for increasing the hand feeling when the keycap 20 is pressed, the thinner keycap waterproof layer 10 is highly elastic and easy to deform, thus the buffer structure 43 is provided for buffering, so that the keycap waterproof layer 10 may support and provide a certain hardness so that the keycap waterproof layer 10 may be better stretched to achieve an aesthetic effect. The configuration of the touch module 60 is convenient for the electronic device to have the function of a mouse. The electronic device may have more functions through the keyboard. When the keyboard is used as an external keyboard of the laptop computer, the touch board of the tablet computer may be acted by the touch module 60, avoiding the heat of the notebook computer affects the operation feel of the keyboard and increasing the practicability of the keyboard. When the keyboard is used as an external keyboard of the tablet computer, the use function of the tablet computer may be increased. Most of the existing tablet computers may be installed with Microsoft's computer operating system, and the touch module 60 is provided to adapt to the above-mentioned computer operating system to turn the tablet computer into a notebook computer, such configuration makes the use of electronic device more functional, and there is more space for operation. Since the touch module 60 is provided, the keyboard forms a hand rest part between the keycap area and the touch module 60, the hand rest part may play the role of supporting the root of the palm when using the keyboard and may support the hand while reducing the pressure of the hand on the keycap area, thereby improving the service life of the keyboard. The keyboard further comprises a bottom waterproof layer 80 wrapping the keyboard, the bottom waterproof layer is bonded to the keycap waterproof layer 10 made of flexible materials, specifically, the materials comprise PU, TPU, TPE, LSR, Silica gel, Rubber and other flexible materials. The thickness of the keycap waterproof layer 10 ranges from 0.01 mm to 0.2 mm, and such a thickness may provide precise structure during the molding process, so as to facilitate subsequent assembly of keyboard. The configuration of the waterproof layer further needs to consider the actual pressing feeling of the keycap 20. When the thickness of the keycap waterproof layer 10 is in the range of 0.01 mm to 0.1 mm, even if the keycap waterproof layer 10 is added to the keycap 20, it will not affect the actual pressing feeling of the keycap 20, and such a keycap waterproof layer 10 is easy to process and produce. In some embodiments of the present disclosure, when the thickness of the keycap waterproof layer 10 is in a range of 0.01 mm to 0.05 mm, the thickness of the keycap waterproof layer 10 is further reduced, so that when it is bonded to the keycap 20, its elasticity is relatively larger, which may better adapt to the size of the keycap 20. Specifically, in this embodiment, the thickness is 0.03 mm. Such a configuration makes the thickness of the keycap waterproof layer 10 moderate and may improve its flexibility, so as to bond with the keycap 20. Materials with higher flexibility may better adapt to the pulling of the keycap 20 during being pressed, reducing the influence of the waterproof layer on the hand feeling of the keycap 20 when being pressed. The thinner the flexible material, the more difficult it is to process, and the higher the corresponding processing and production cost. The thicker the flexible material, the lower the processing difficulty and the higher the material cost. Therefore, a moderate thickness selection may balance the processing difficulty and production cost. The bottom waterproof layer 80 is made of waterproof leather, textiles or nano-fabric material. The bottom waterproof layer 80 is used to waterproof the overall bottom of the keyboard, and is bonded to the keycap waterproof layer 10 to wrap the overall keyboard. Such configuration makes the keyboard integrally formed, and the upper surface of the keyboard is waterproof and dustproof be means of the keycap waterproof layer 10, the bottom is waterproof and dustproof by means of the bottom waterproof layer 80, and the side is waterproof and dustproof by means of the coupling of the bottom waterproof layer 80 and the keycap waterproof layer 10.

As shown in FIGS. 30 to 35, Embodiment 10 of the present disclosure provides an electronic device, which may be a notebook computer, a two-in-one tablet device or other electronic devices, comprising a keyboard, which may be the keyboard of any one of embodiments 3 to 8, the electronic device further comprises a housing and a touch module 60, wherein a cover 67 is formed as a part of the housing, and the housing of the electronic device may be integrally formed to improve structural strength and aesthetics of electronics housings. The specific structure of the touch module 60 may be referred to the above-mentioned embodiments. The electronic device may adopt any one or all the technical solutions of the above-mentioned embodiments, it at least has all the beneficial effects brought by the technical solutions of the above-mentioned embodiments, which will not be repeated again.

As shown in FIGS. 30 to 35, in the technical solution of this embodiment, a touch module 60 sequentially comprises a decorative panel 61, a touch waterproof layer 62, a substrate 63, a plastic sheet layer 64, a PCB board 65, a metal support 66 and a cover body 67, wherein the substrate 63 is provided with a hollow groove 631 that runs through the substrate 63, the decorative panel 61, the touch waterproof layer 62, the plastic sheet layer 64, the PCB board 65 and the metal support 66 are all provided with in the hollow groove 631, the substrate 63 is fixed on the cover body 67. The touch module 60 is mainly used to sense the user's touch, press and other input terminal operations, so as to realize corresponding functions. It should be noted that the touch waterproof layer 62 may be a part of the keycap waterproof layer 10, and the touch waterproof layer 62 and the keycap waterproof layer 10 are integrally structured.

Figure 31:
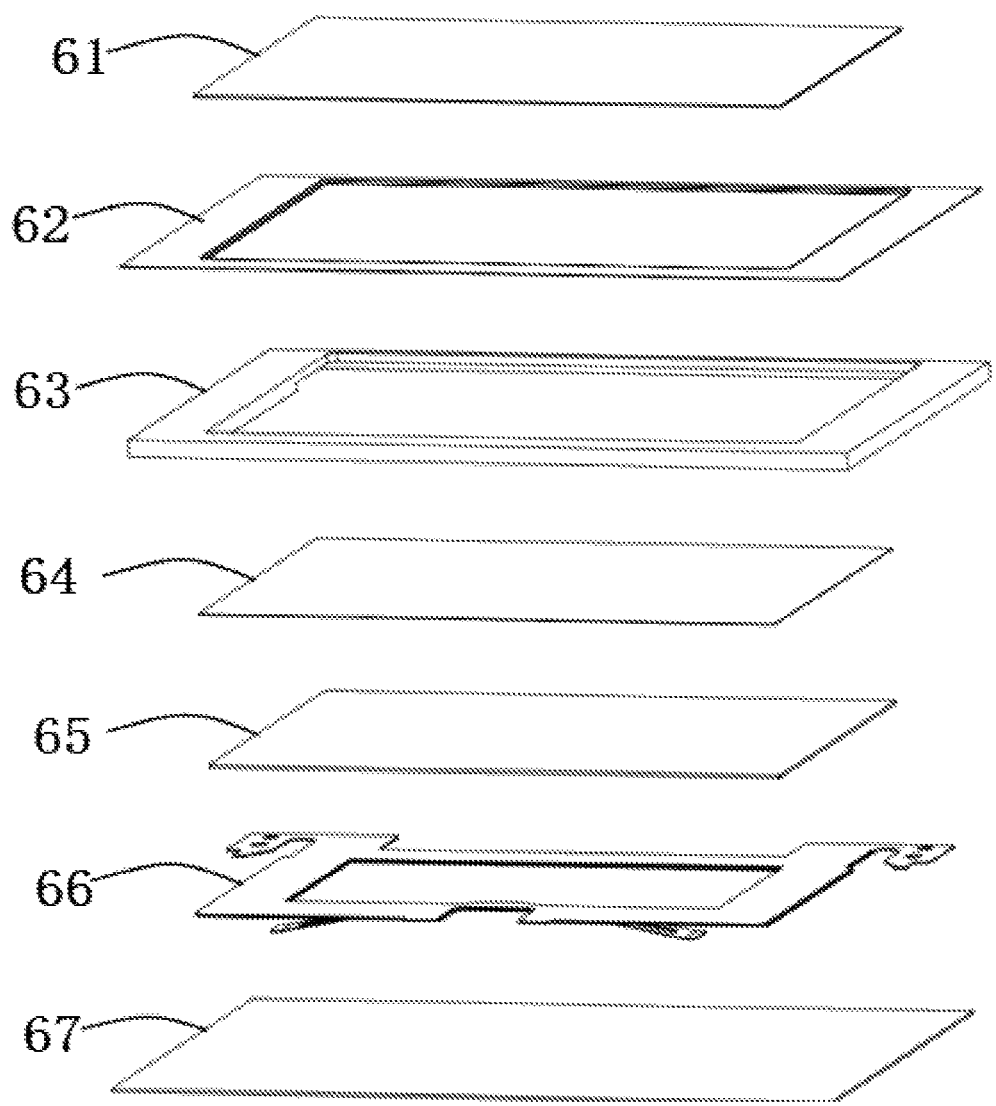
FIG. 31 shows an exploded structure diagram of a touch module of the electronic device in FIG. 30.
Figure 32:
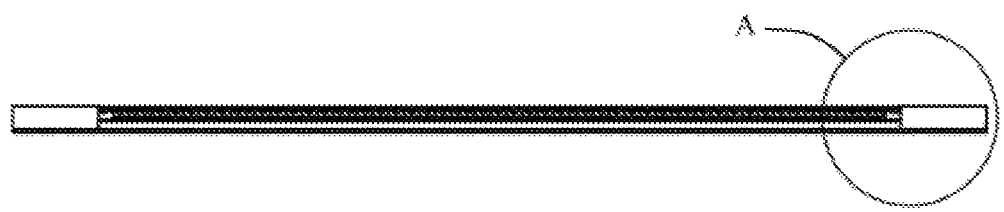
FIG. 32 shows a stacked structure diagram of the touch module of the electronic device in FIG. 30.
Figure 33:
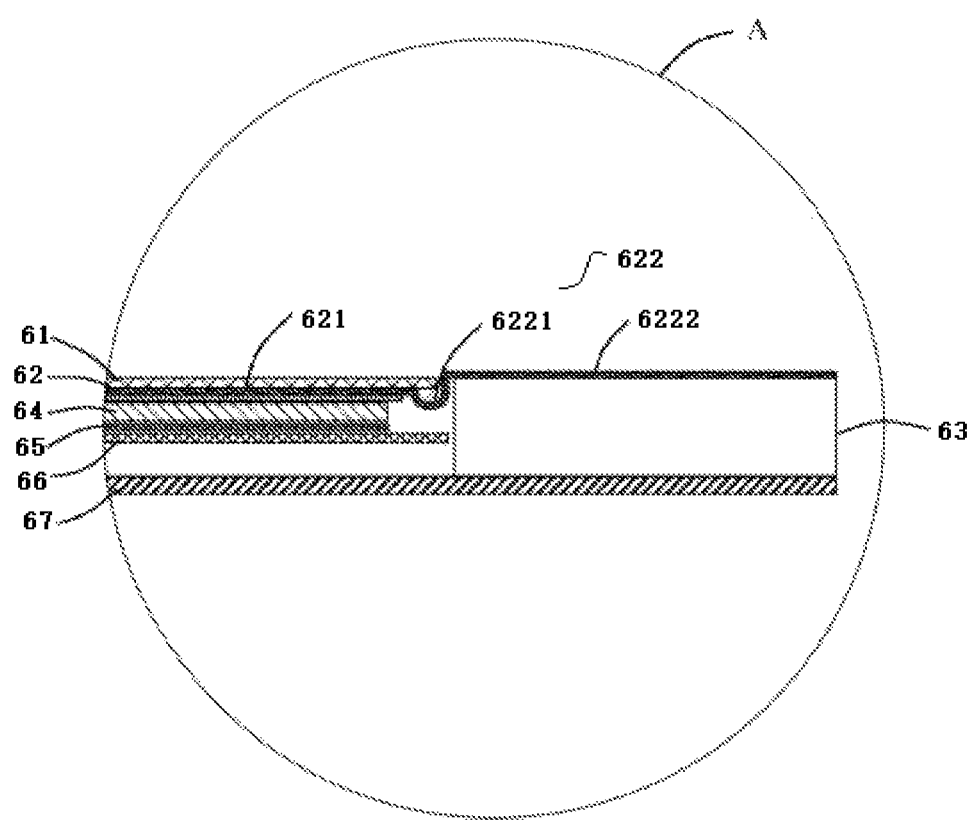
FIG. 33 shows a partial enlarged diagram of A in FIG. 32.

As shown in FIGS. 31 to 33, in the technical solution of this embodiment, the plastic sheet layer 64 is located between the touch waterproof layer 62 and the PCB board 65 and is used to support the touch waterproof layer 62, which may improve the extent of bonding of the PCB board 65 with the touch waterproof layer 62 and further improve the hand feeling of the touch module 60 after being pressed and rebounded; the material of the decorative panel 61 is hard materials such as glass, plastic sheet, metal sheet, etc., since the touch waterproof layer 62 is generally made of a flexible material, with a large friction, low smooth surface which may result in blocked hand feeling and is easily damaged when exposed to the surface. Therefore, the outer surface of the touch waterproof layer 62 should be covered with a hard material layer, that is, a decorative panel 61. Meanwhile, AG and AF surface treatments are performed on the surface of the decorative panel 61. AG, anti-glare treatment may reduce the contact area when fingers touch the surface of the material, reduce sliding resistance, and improve the smooth touch of sliding touch. AF, anti-fingerprint treatment generally adds a layer of hydrophobic coating on the surface of the material, which may improve the anti-fouling, anti-scratch, and wear resistance of the material, and further improve the smooth touch of sliding touch; the PCB board may be pasted and fixed on the metal support 66, and be connected with the electronic components inside the decorative panel 61 by signal to sense the operation of the decorative panel 61, the metal support 66 may support to improve the stability of the overall installation of the touch module 60; the metal support 66 is made of a rigid material as it has better stability and is not easily deformed, so as to prevent the metal support 66 from deforming together with the pressure induction of the PCB board 65 and affecting the detection of the pressure signal. The touch waterproof layer 62 is provided between the decorative panel 61 and the PCB board 65, and is used to prevent water from penetrating into the PCB board 65 from the decorative panel 61 and affecting the normal function of the PCB board 65. The material of the touch waterproof layer 62 is one or more of polyurethane, polyurethane elastomer, silicon, rubber, liquid silicone.

As shown in FIGS. 31 to 33, in the technical solution of this embodiment, the touch waterproof layer 62 comprises a touch waterproof layer body 621 and an elastic recess structure 622 provided on an outer edge of the touch waterproof layer body 621, the elastic recess structure 622 is suspended in the hollow groove 631, the touch waterproof layer 62 is elastically connected with the substrate 63 by means of the elastic recess structure 622. A shape of the touch waterproof layer body 621 is the same as that of the PCB board, an upper surface and a lower surface of the touch waterproof layer body 621 are respectively bonded to the decorative panel 61 and the plastic sheet layer 64, which may be bonded by conventional methods for fixing. The elastic recess structure 622 is connected with the substrate 63. The elastic recess structure 622 comprises a U-shaped or V-shaped elastic recess 6221 formed by bending the outer edge of the touch waterproof layer body 621, and a fixing plate 6222 that is away from the touch waterproof layer body 621 and connected with the elastic recess 6221, the fixing plate 6222 is fixed on the substrate 63 and keeps relatively fixed with the substrate 63, the elastic recess 6221 may drive the touch waterproof layer body 621 to move elastically up and down in the hollow groove 631; The elastic recess structure 622 is provided around the outer edge of the touch waterproof layer body 621 to ensure an entirely touch waterproof performance. By means of the elastic recess structure 622, on the one hand, it provides sufficient stretching space for the entire touch module 60 to be pressed down and click on the touch waterproof layer 62; one the other hand, an elastic arm is also formed, bring the touch module 60 a certain space for rebounding. In this way, the touch module 60 has a downward pressure stretching space and a rebound space, which ensures the basic functions of the touch module 60 and improves the hand feeling of pressing and rebounding.

In some embodiments of the present disclosure, as shown in FIGS. 32 and 33, in the technical solution of this embodiment, the length and width of the touch waterproof layer body 621 are greater than those of the PCB board 65 to prevent the elastic recess 6221 from being pressed down and directly touches the PCB board 65, which is easy to cause damage; the length and width of the touch waterproof layer body 621 are smaller than those of the decorative panel 61, that is, the elastic recess 6221 overlaps with the decorative panel 61 at least partially in a radial direction, thus, the decorative panel 61 may block a part of water from the edge of the decorative panel 61 to flow into the touch waterproof layer 62, so as to further improve the touch waterproof performance of the touch module 60.

As shown in FIG. 32 and FIG. 33, in the technical solution of this embodiment, a side of the elastic recess 6221 connected with the fixing plate 6222 extends upwards more than a side of the elastic recess 6221 connected with the touch waterproof layer body 621, so that the level of the fixing plate 6222 is higher than the level of the touch waterproof layer body 621 and slightly higher than the level of the upper surface of the substrate 63, the fixing plate 6222 and the substrate 63 overlap at least partially in the radial direction, and the fixing plate 6222 is fixed and bonded to the upper surface of the substrate 63 to realize a elastically connection of the touch waterproof layer 62 with the substrate 63. The fixing plate 6222 is fixed on the substrate 63. The touch waterproof layer body 621 may drive the decorative panel 61, the plastic sheet layer 64, the PCB board and the metal support 66 bounce up and down synchronously under the elastic action of the elastic recess 6221. In some embodiments of the present disclosure, the touch waterproof layer 62 may be bonded to the substrate 63 by means of conventional processes such as process lamination, double-shot molding, and in-mold injection molding, which is easy to manufacture and has a high degree of installation matching.

Figure 34:
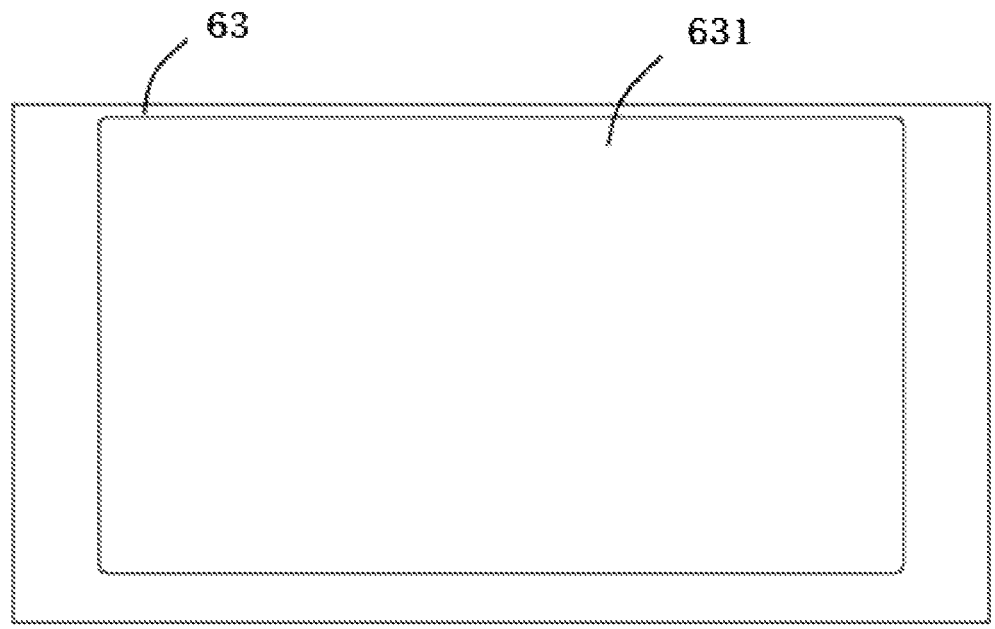
FIG. 34 shows a plane structure diagram of a substrate of the touch module in FIG. 30, wherein 34(*a*) is an upper plane diagram of the substrate, and 34(*b*) is a lower plane diagram of the substrate.
Figure 34:
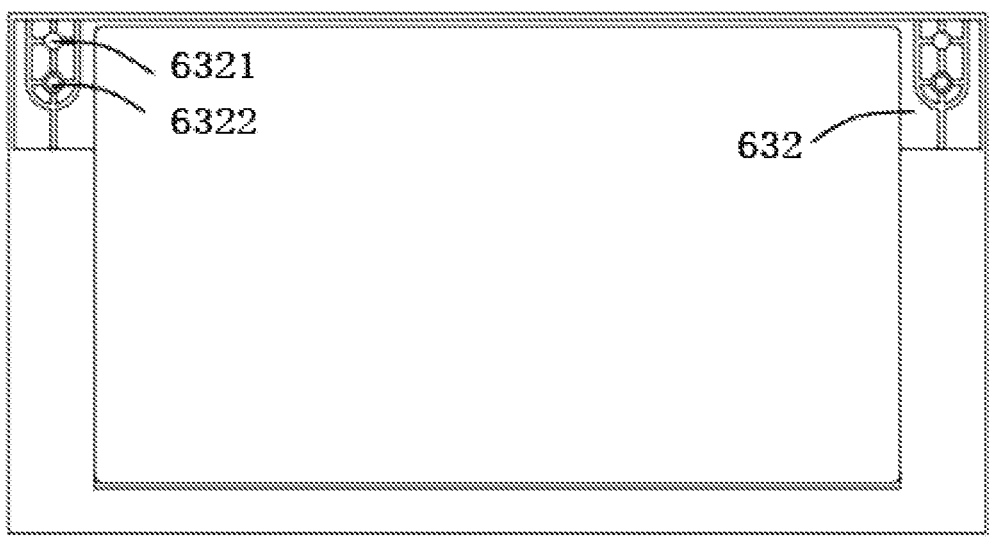
Figure 35:
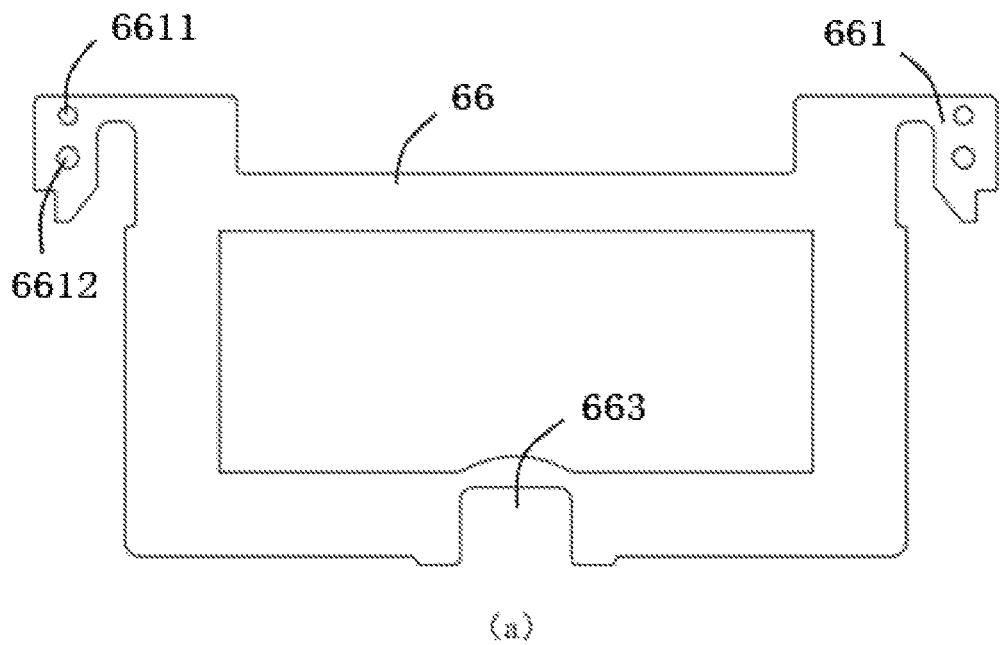
FIG. 35 shows a plane structure diagram of a metal support of the touch module in FIG. 30, wherein 35(*a*) is an upper plane diagram of the metal support, and 35(*b*) is a lower plane diagram of the metal support.
Figure 35:
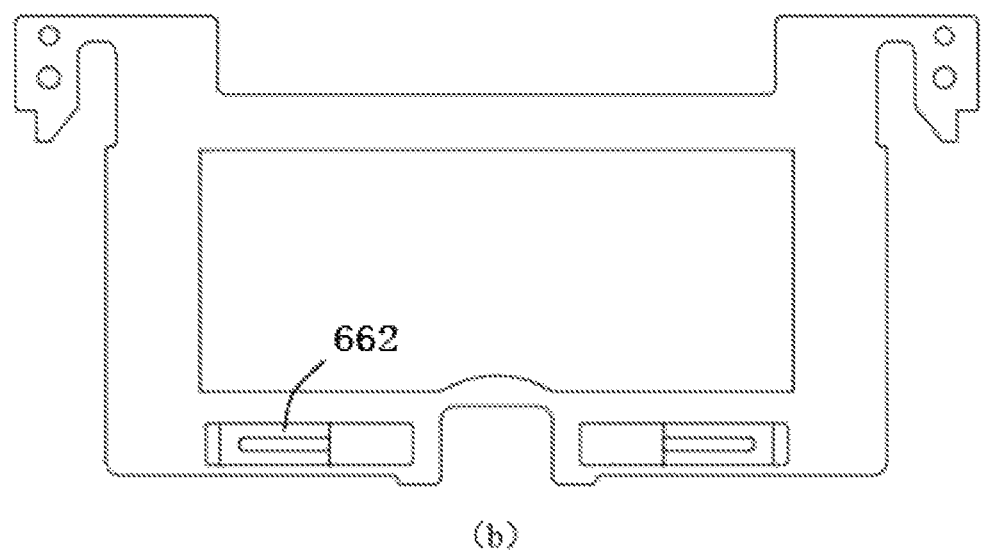

As shown in FIG. 34 and FIG. 35, in the technical solution of this embodiment, in order to install the metal support 66 and the substrate 63 stably, the substrate 63 in this embodiment is square-shaped and mainly made of plastic, metal and other materials, wherein a hollow groove 631 penetrated therein is formed. The lower surface of the substrate 63, that is, two sides of the surface where the substrate 63 connects with the metal support 66 is symmetrically provided with a concave mounting part 632 with a thickness smaller than that of the substrate 63. Each mounting part 632 is provided with a fourth through hole 6321 and a fifth through hole 6322 provided symmetrically, the mounting part 632, the fourth through hole 6321 and the fifth through hole 6322 on the mounting part 632 are used for positioning and connecting with the metal support 66. The metal support 66 has a left-right symmetrical structure, and its two sides are respectively provided with a lug 661 formed by bending two sides of the metal support 66 upwards. The lug 661 is respectively provided with a sixth through hole 6611 and a seventh through hole 6612 corresponding to the fourth through hole 6321 and the fifth through hole 6322. The lug 661 is fixedly installed in the mounting part 632 of the substrate 63 to play a fixing role, and the rest of the metal support 66 is provided in the hollow groove 631 of the substrate 63 to support the PCB board 65, the plastic sheet layer 64, the touch waterproof layer 62 and the decorative panel 61 provided on the metal support 66. The lower surface of the metal support 66 is further provided with two symmetrical elastic arms 662, the elastic arm 662 stands on the cover body 67 and may provide buffer and assist rebound when the elastic recess structure 622 of the touch waterproof layer 62 drives the PCB board to bounce up and down. In this embodiment, two lugs 661 are symmetrically bent formed on both sides of the metal support 66 in the length direction, and the metal support 66, the lug 661 and the elastic arm 662 may formed into an integrated structure to increase structural strength; the fourth through hole 6321 and the fifth through hole 6322 may be threaded holes, the sixth through hole 6611 and the seventh through hole 6612 may be threaded holes or through holes, the fourth through hole 6321 is the same size as the sixth through hole 6611, and the fifth through hole 6322 may be the same size as the seventh through hole 6612, so that a screw connector may be utilized to pass through the sixth through hole 6611 and the seventh through hole 6612 and then fixed in the fourth through hole 6321 and the fifth through hole 6322 of the substrate 63 respectively, realizing the installation and fixation of the metal support 66, with relatively simple disassembly operation.

In some embodiments of the present disclosure, as shown in FIG. 35, in the technical solution of this embodiment, an edge of the metal support 66 is further provided with a limiting notch 663 for limiting the metal support 66. By providing the limiting notch 663, it may engage with a limiting bump on the substrate 63, thereby preventing planar movement between the metal support 66 and the substrate 63, so that the touch module 60 may be installed accurately.

On the basis of the above-mentioned embodiments, the shape of the limiting notch 663 of the metal support 66 is a square with rounded corners. The limiting notch 663 of this shape is easy to process and form, thereby improving the efficiency of processing, and may further produce a certain position-limiting effect in various directions. The position-limiting effect prevents the planar sliding of the metal support 66 and facilitates disassembly.

Figure 36:
FIG. 36 shows a stacked structure diagram of a touch module provided in Embodiment 11 of the present disclosure.
Figure 37:
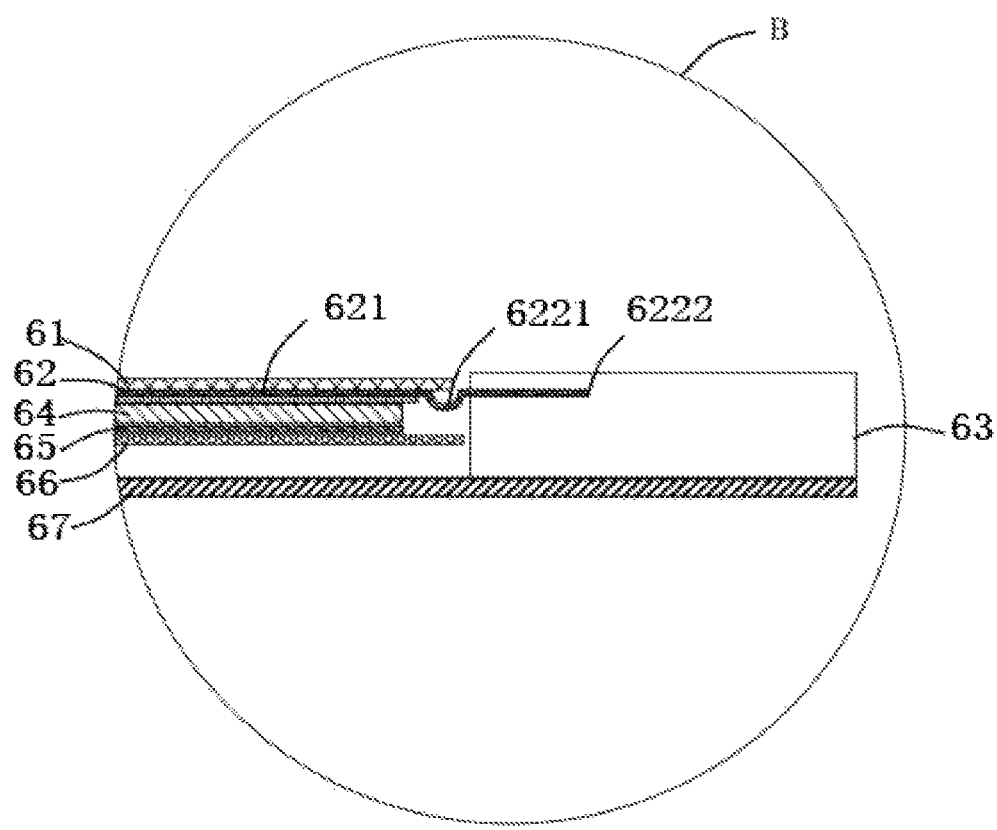
FIG. 37 shows a partial enlarged diagram of B in FIG. 36.

As shown in FIG. 36 and FIG. 37, Embodiment 11 of the present disclosure provides a touch module for an electronic device. The difference from Embodiment 10 is that lengths of a side of the elastic recess 6221 connected with the fixing plate 6222 and a side of the elastic recess 6221 connected with the waterproof layer body 621 extending upward are the same, so that the fixing plate 6222 is aligned with the touch waterproof layer body 621, that is, the fixing plate 6222 and the touch waterproof layer body 621 are on the same horizontal plane, and the level of the fixing plate 6222 is between the thickness of the substrate 63, the fixing plate 6222 and the substrate 63 overlap at least partially in the radial direction, the fixing plate 6222 is embedded in the substrate 63, so as to realize the elastic connection between the touch waterproof layer 62 and the substrate 63. The fixing plate 6222 is fixed on the substrate 63, the touch waterproof layer body 621 may drive the decorative panel 61, the plastic layer 64, the PCB board and the metal support 66 to bounce up and down synchronously under the elastic effect of the elastic recess 6221. In some embodiments of the present disclosure, the touch waterproof layer 62 may be bonded to the substrate 63 by means of conventional techniques such as double-shot molding and in-mold injection molding, which is easy to manufacture and highly matching for installation.

On the basis of the above-mentioned embodiments, the touch waterproof layer 62 is hermetically connected with the substrate 63, and the connected part may be strengthened with an adhesive, so that components located below the touch waterproof layer 62 are isolated from the outside, especially the PCB board 65 is completely isolated from the decorative panel 61, which is exposed to the air. When the user accidentally spills water on the decorative panel 61, the touch waterproof layer 62 may isolate the water above the touch waterproof layer 62 to prevent water from entering the PCB board 65, which may cause problems such as pollution or short circuit; the structural design of the touch waterproof layer 62 not only provides touch waterproof performance, but further improves the touch rebound feeling of the touch module 60 by simple structural design, ensuring user experience.

To sum up, compared with the prior art, the touch module 60 and the electronic device of this embodiment of the present disclosure have the following advantages: In the three-stage structure of the conventional touch module design, a touch waterproof layer 62 is added, the touch waterproof layer 62 is located between the decorative panel 61 and the PCB board 65, which not only ensures the hand feeling of use, but further provides touch waterproofness; the touch waterproof layer 62 is made of conventional flexible touch waterproof materials and the waterproof layer 62 is bonded to the substrate 63 by means of conventional techniques such as processing bonding, double-shot molding, and in-mold injection molding, etc., which is easy to manufacture and low in cost; the touch waterproof layer 62 is further provided with an elastic recess structure 622, which not only provides a stretching space for the touch substrate 63 for pressing down and clicking the touch waterproof layer 62, but also provides a certain rebound space for the touch module 60. By means of simple structural design, basic functions of the touch module 60 are realized and the touch rebound feeling of the touch module 60 is improved. The touch module 60 and the electronic device of the present embodiment greatly improve the touch waterproof performance while ensuring the user's experience.

It should be noted that in this article, relative terms such as "first" and "second" are only used to distinguish one entity or operation from another entity or operation, and do not necessarily require or imply such actual relationship or order existing between these entities or operations. Furthermore, the term "comprises", "comprising" or any other variation thereof is intended to cover a non-exclusive inclusion such that a process, method, article, or apparatus comprising a provided of elements comprises not only those elements, but further comprises elements not expressly listed, or other elements inherent in such a process, method, article, or device. Without further limitations, an element defined by the phrase "comprising a . . . " does not exclude the presence of additional identical elements in the process, method, article or apparatus comprising said element.

The above descriptions are only specific implementation manners of the present disclosure, so that those skilled in the art may understand or implement the present disclosure. Various modifications to these embodiments will be readily apparent to those skilled in the art, and the general principles defined herein may be implemented in other embodiments without departing from the spirit or scope of the present disclosure. Therefore, the present disclosure will not be limited to the embodiments shown herein, but is to be accorded the widest scope consistent with the principles and novel features disclosed herein.

What is claimed is:

1. A keyboard, comprising:
   a keyboard module comprising a plurality of keycaps and a keyboard body;
   a body waterproof layer provided with an accommodating part;
   a keycap waterproof layer comprising a first bonding part and a second bonding part, and
   a support assembly,
   wherein
   each of the keycaps passes through the accommodating part, and the body waterproof layer is connected with the keyboard body;
   the first bonding part is bonded to a side of each of the keycaps away from the keyboard body, and the second bonding part is bonded to the accommodating part;
   the body waterproof layer and the keycap waterproof layer are both an integrally formed structure; and
   the support assembly comprises a support layer and a first support structure, wherein the support layer is provided between the first support structure and the keyboard body.

2. The keyboard of claim 1, wherein the support layer comprises a third accommodating structure,
   wherein the third accommodating structure is net-shaped and is provided with a plurality of third through holes, the keycaps are provided in one-to-one correspondence with the third through holes, and each of the keycaps passes through the third accommodating structure and is bonded to the first bonding part.

3. The keyboard of claim 1, wherein the keyboard further comprises a bottom waterproof layer wrapping the keyboard module and bonded to the body waterproof layer made of flexible material, the bottom waterproof layer is made of waterproof leather, textiles or nano-fabric material, and the first support structure is made of PC, PET, PI, LCP or FR4 material.

4. The keyboard of claim 1, wherein the accommodating part further comprises a first accommodating structure and a second accommodating structure, the keycap waterproof layer further comprises a third bonding part, the first accommodating structure is provided around a plurality of the keycaps, the third bonding part is provided around the first bonding part and the second bonding part, the third bonding part is bonded to the first accommodating structure, the second accommodating structure is net-shaped and is provided with a plurality of first through holes,
   wherein the keycaps are provided in one-to-one correspondence with the first through holes, each of the keycaps passes through each of the first through holes and is bonded to the first bonding part, and the second accommodating structure is bonded to the second bonding part.

5. The keyboard of claim 4, wherein the body waterproof layer and the keycap waterproof layer are both an integrally formed structure, the first accommodating structure, the second accommodating structure, the second bonding part, and the third bonding part are integrated;
   the first support structure is net-shaped, the first support structure is bonded to the second bonding part, both the first support structure and the second bonding part are provided in a clearance between adjacent ones of the plurality of keycaps, and the first support structure is an integrally formed structure.

6. The keyboard of claim 5, wherein a fit clearance is provided between the first support structure and a third accommodating structure, and a height H of the fit clearance is in a range of 0.15 mm to 0.5 mm.

7. The keyboard of claim 1, wherein the support assembly further comprises a buffer structure provided between the body waterproof layer and the support layer, the buffer structure comprises a first limiting part configured to surround the first support structure, and the buffer structure is bonded to the support layer.

8. The keyboard of claim 7, wherein the keyboard further comprises a touch module, the support layer further comprises a fourth accommodating structure, the touch module is provided in the fourth accommodating structure, the buffer structure further comprises a second limiting part, the touch module partially passes through the second limiting part and is connected with the body waterproof layer, and a touch part is provided at a position of the body waterproof layer corresponding to the touch module.

9. The keyboard of claim 8, wherein the touch module comprises a decorative panel and a touch mainboard, the support layer further comprises a mounting frame provided in the fourth accommodating structure, the decorative panel is provided on the touch part, the touch mainboard is fixedly connected with the mounting frame, the touch mainboard is in contact with a side of the touch part away from the decorative panel, and the touch mainboard is electrically connected with the keyboard body.

10. The keyboard of claim 9, wherein:
    the keycap waterproof layer further comprises a fourth bonding part;
    the keycap comprises a pressing surface, a keycap through hole and a keycap side wall, an opening of the keycap through hole is provided in the pressing surface, the first bonding part is bonded to the pressing surface, and the keycap side wall is bonded to the fourth bonding part; and
    a third accommodating structure is bonded to the second bonding part, an accommodating clearance is provided between the third accommodating structure and a vertical plane where a bottom lateral side of an adjacent one of the plurality of keycaps is located, and when the keycap is pressed, a deformation area of the keycap waterproof layer is located in the accommodating clearance.

11. The keyboard of claim 10, wherein the deformation area is a deformation part of the keycap waterproof layer, comprising a curving section and a bending section connected in sequence, an end of the curving section away from the bending section is connected with the fourth bonding part, the bending section is connected with the second bonding part, when the keycap is pressed, the deformation part is completely accommodated in the accommodating clearance, and the bending section rotates about a connection point between the bending section and the second bonding part.

12. The keyboard of claim 11, wherein, when the keycap is not pressed, the fourth bonding part is completely bonded to a side wall of the keycap, and at least part of the deformation part is located within the accommodating clearance, or when the keycap is not pressed, the bending section and the second bonding part are located in a same plane, the bending section is arc-shaped, and the curving section is located on a side of a plane close to the keycap.

13. The keyboard of claim 12, further comprising an adhesive layer provided between the pressing surface and the first bonding part and respectively bonded to the pressing surface and the first bonding part, the keycap comprises a plurality of keycap through holes, a central axis of each of the keycap through holes is perpendicular to the pressing surface, a cross section of each of the keycap through holes is circular, and a maximum size of the cross section of the keycap through hole is in a range of 0.05 mm to 0.2 mm.

14. The keyboard of claim 13, wherein a hole wall of the keycap through hole is provided in a straight line along a direction of the central axis; and/or a hole wall of the keycap through hole gradually moves away from the central axis along a direction of the central axis away from the pressing surface.

15. The keyboard of claim 13, wherein the keycap further comprises a limiting part surrounding the pressing surface to form an accommodating cavity of the adhesive layer.

16. An electronic device comprising: the keyboard of claim 1 and a device body, wherein the keyboard is connected with the device body by a signal.

17. The electronic device of claim 16, wherein the keyboard comprises a touch module comprising:
 a substrate provided with a hollow groove;
 a decorative panel provided in the hollow groove;
 a PCB board provided in the hollow groove and located below the decorative panel; and
 a touch waterproof layer located between the decorative panel and the PCB board,
 wherein the touch waterproof layer comprises a touch waterproof layer body and an elastic recess structure provided on an outer edge of the touch waterproof layer body, the elastic recess structure is suspended in the hollow groove, and the touch waterproof layer is elastically connected with the substrate by the elastic recess structure.

18. The electronic device of claim 17, wherein the elastic recess structure comprises an elastic recess formed by bending the outer edge of the touch waterproof layer body and a fixing plate being away from the touch waterproof layer body and connected with the elastic recess, the fixing plate is fixedly connected with the substrate, the decorative panel covers at least part of the elastic recess, the elastic recess is provided in U shape or V shape, a horizontal height of the fixing plate is higher than a horizontal height of the touch waterproof layer body, and the fixing plate is attached to an upper surface of the substrate; or the fixing plate is aligned with the touch waterproof layer body, and the fixing plate is embedded in the substrate.

19. The electronic device of claim 18, wherein the touch module further comprises a plastic sheet layer, a metal support and a cover, the plastic sheet layer is located between the touch waterproof layer and the PCB board, the PCB board is placed on the metal support, and the metal support is provided with an elastic arm supported downward on the cover.

* * * * *